US011562555B2

(12) United States Patent
Ramalingam

(10) Patent No.: US 11,562,555 B2
(45) Date of Patent: Jan. 24, 2023

(54) METHODS, SYSTEMS, ARTICLES OF MANUFACTURE, AND APPARATUS TO EXTRACT SHAPE FEATURES BASED ON A STRUCTURAL ANGLE TEMPLATE

(71) Applicant: The Nielsen Company (US), LLC, New York, NY (US)

(72) Inventor: Venkadachalam Ramalingam, Nagercoil (IN)

(73) Assignee: THE NIELSEN COMPANY (US), LLC, New York, NY (US)

( * ) Notice: Subject to any disclaimer, the term of this patent is extended or adjusted under 35 U.S.C. 154(b) by 129 days.

(21) Appl. No.: 17/336,902

(22) Filed: Jun. 2, 2021

(65) Prior Publication Data

US 2022/0391630 A1 Dec. 8, 2022

(51) Int. Cl.
*G06K 9/00* (2022.01)
*G06V 10/75* (2022.01)
*G06K 9/62* (2022.01)
*G06V 10/44* (2022.01)
*G06V 10/72* (2022.01)
*G06V 10/74* (2022.01)

(52) U.S. Cl.
CPC ......... *G06V 10/757* (2022.01); *G06K 9/6215* (2013.01); *G06K 9/6298* (2013.01); *G06V 10/443* (2022.01); *G06V 10/72* (2022.01); *G06V 10/761* (2022.01)

(58) Field of Classification Search
None
See application file for complete search history.

(56) References Cited

U.S. PATENT DOCUMENTS 5,027,422 A * 6/1991 Peregrim ............. G06V 10/757
382/199
5,168,530 A * 12/1992 Peregrim ............... G06V 10/36
382/199
5,809,322 A * 9/1998 Akerib ................. G06V 10/955
710/33

(Continued)

OTHER PUBLICATIONS

Desoky et al., "Enhancing iris recognition system performance," The 2010 International Conference on Computer Engineering & Systems, 2010, pp. 21-26 (Year: 2010).*

(Continued)

*Primary Examiner* — Feng Niu
(74) *Attorney, Agent, or Firm* — Hanley, Flight & Zimmerman, LLC

(57) ABSTRACT

Methods, systems, articles of manufacture, and apparatus to extract shape features based on a structural angle template are disclosed. An example apparatus includes a template generator to generate a template based on an input image and calculate a template value based on values in the template; a bit slicer to calculate an OR bit slice and an AND bit slice based on the input image, combine the OR bit slice with the AND bit slice to generate a fused image, group a plurality of pixels of the fused image to generate a pixel window, each pixel of the pixel window including a pixel value, and calculate a window value based on the pixel values of the pixel window; and a comparator to compare the template value with the window value and store the pixel window in response to determining the window value satisfies a similarity threshold with the template value.

23 Claims, 19 Drawing Sheets

(56) References Cited

U.S. PATENT DOCUMENTS

| | | | | |
|---|---|---|---|---|
| 5,974,521 | A * | 10/1999 | Akerib | G06V 10/443 |
| | | | | 712/34 |
| 6,031,568 | A * | 2/2000 | Wakitani | G06T 7/20 |
| | | | | 348/169 |
| 6,460,127 | B1 * | 10/2002 | Akerib | G06V 10/955 |
| | | | | 712/18 |
| 6,678,414 | B1 * | 1/2004 | Loce | G06V 10/36 |
| | | | | 382/209 |
| 6,686,922 | B2 * | 2/2004 | Loce | G06V 10/443 |
| | | | | 345/596 |
| 6,807,304 | B2 * | 10/2004 | Loce | H04N 1/40075 |
| | | | | 382/209 |
| 7,190,832 | B2 * | 3/2007 | Frost | G01N 21/6428 |
| | | | | 382/173 |
| 8,750,580 | B2 * | 6/2014 | Nagashima | G06V 40/171 |
| | | | | 382/118 |
| 8,934,672 | B2 * | 1/2015 | Holeva | B66F 9/24 |
| | | | | 382/103 |
| 8,995,743 | B2 * | 3/2015 | Holeva | G06T 7/13 |
| | | | | 382/141 |
| 11,379,688 | B2 * | 7/2022 | Di Febbo | G06K 9/6273 |
| 2002/0080144 | A1 * | 6/2002 | Loce | G06V 10/443 |
| | | | | 345/589 |
| 2003/0161534 | A1 * | 8/2003 | Loce | H04N 1/40075 |
| | | | | 382/199 |
| 2008/0166016 | A1 * | 7/2008 | Sibiryakov | G06V 10/255 |
| | | | | 382/103 |
| 2012/0288164 | A1 * | 11/2012 | Nagashima | G06V 30/2504 |
| | | | | 382/117 |
| 2013/0101166 | A1 * | 4/2013 | Holeva | G06T 7/13 |
| | | | | 382/199 |
| 2013/0101167 | A1 * | 4/2013 | Holeva | G06T 7/13 |
| | | | | 382/103 |
| 2013/0182934 | A1 * | 7/2013 | Topfer | G06V 10/28 |
| | | | | 382/132 |
| 2014/0270347 | A1 * | 9/2014 | Xu | G06T 7/001 |
| | | | | 382/199 |
| 2014/0294237 | A1 * | 10/2014 | Litvak | G06V 10/803 |
| | | | | 382/103 |
| 2014/0321710 | A1 * | 10/2014 | Robert | G06T 7/0016 |
| | | | | 382/103 |
| 2015/0332471 | A1 * | 11/2015 | Heo | G06T 7/174 |
| | | | | 382/103 |
| 2018/0268256 | A1 * | 9/2018 | Di Febbo | G06T 7/001 |

OTHER PUBLICATIONS

Ko et al., "Digital image stabilizing algorithms based on bit-plane matching," in IEEE Transactions on Consumer Electronics, vol. 44, No. 3, pp. 617-622, Aug. 1998 (Year: 1998).*

Louri et al., "A bit-plane architecture for optical computing with two-dimensional symbolic substitution," [1988] The 15th Annual International Symposium on Computer Architecture. Conference Proceedings, 1988, pp. 18-27 (Year: 1988).*

Sudhakar et al., "A novel approach for retrieval of medical images in bit plane domain," 2011 IEEE International Conference on Signal and Image Processing Applications (ICSIPA), 2011, pp. 478-483 (Year: 2011).*

* cited by examiner

MATRIX 13

MATRIX 14

MATRIX 15

MATRIX 16

MATRIX 17

MATRIX 18

MATRIX 19

MATRIX 20

MATRIX 21

MATRIX 22

MATRIX 23

MATRIX 24

MATRIX 25

MATRIX 26

MATRIX 27

MATRIX 28

MATRIX 29

MATRIX 30

MATRIX 31

MATRIX 32

MATRIX 33

MATRIX 34

MATRIX 35

MATRIX 36

MATRIX 37

MATRIX 38

MATRIX 39

MATRIX 40

MATRIX 41

MATRIX 42

MATRIX 43

MATRIX 44

MATRIX 45

MATRIX 46

MATRIX 47

MATRIX 48

MATRIX 49

MATRIX 50

MATRIX 51

MATRIX 52

MATRIX 53

MATRIX 54

MATRIX 55

MATRIX 56

MATRIX 57

MATRIX 58

MATRIX 59

MATRIX 60

MATRIX 61

MATRIX 62

MATRIX 63

MATRIX 64

MATRIX 65

MATRIX 66

MATRIX 67

MATRIX 68

MATRIX 69

MATRIX 70

MATRIX 71

MATRIX 72

MATRIX 73

MATRIX 74

MATRIX 75

MATRIX 76

MATRIX 77

MATRIX 78

MATRIX 79

MATRIX 80

MATRIX 81

MATRIX 82

MATRIX 83

500

METHODS, SYSTEMS, ARTICLES OF MANUFACTURE, AND APPARATUS TO EXTRACT SHAPE FEATURES BASED ON A STRUCTURAL ANGLE TEMPLATE

FIELD OF THE DISCLOSURE

This disclosure relates generally to image feature extraction, and, more particularly, to methods, systems, articles of manufacture, and apparatus to extract shape features in an image based on a shape template.

BACKGROUND

In recent years, the need for computers to determine features in an image has drastically increased. Computers are now expected to receive input images, identify objects within the input images, and present the user with images of similar objects. Such expectations require adequate computations and resources.

BRIEF DESCRIPTION OF THE DRAWINGS

The figures are not to scale. Instead, the thickness of the layers or regions may be enlarged in the drawings. In general, the same reference numbers will be used throughout the drawing(s) and accompanying written description to refer to the same or like parts.

Unless specifically stated otherwise, descriptors such as "first," "second," "third," etc. are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

DETAILED DESCRIPTION

In recent years, image data collection has become an important component of consumer research. Image data can provide valuable information about in-store consumer products (e.g., pricing, quantity, display, and other information). Digital image processing can be used to decode receipts, detect price tags, and/or identify objects in an image and associate the objects with products. For example, a user (e.g., a data collector) may photograph a shelf at a retail store and employ image processing techniques to detect individual objects on the shelf, associate the objects with products, obtain pricing information for the products, determine the quantity of each product, and/or assess the arrangement of the products on the shelf. This information can be valuable to companies and consumer research entities seeking to improve consumer experience.

Prior techniques for object detection (e.g., the Sobel edge detection method, the Canny edge detection method, and other edge detection algorithms) are susceptible to overlooking small features of an object in an image (e.g., lines, curves, edges, etc.), which leads to inaccurate output and unreliable results. The accuracy of output images produced by these methods diminishes even further when the input image is subject to defects such as blurring, overbrightness, and/or high contrast.

Examples disclosed herein enable high accuracy edge detection, object identification, and/or image retrieval for digital images. Examples disclosed herein may be used to generate detailed images and extract features (e.g., nano features) within those images. In some examples disclosed herein, input images are transformed into vectors to conserve storage space in a computer.

Figure 1:
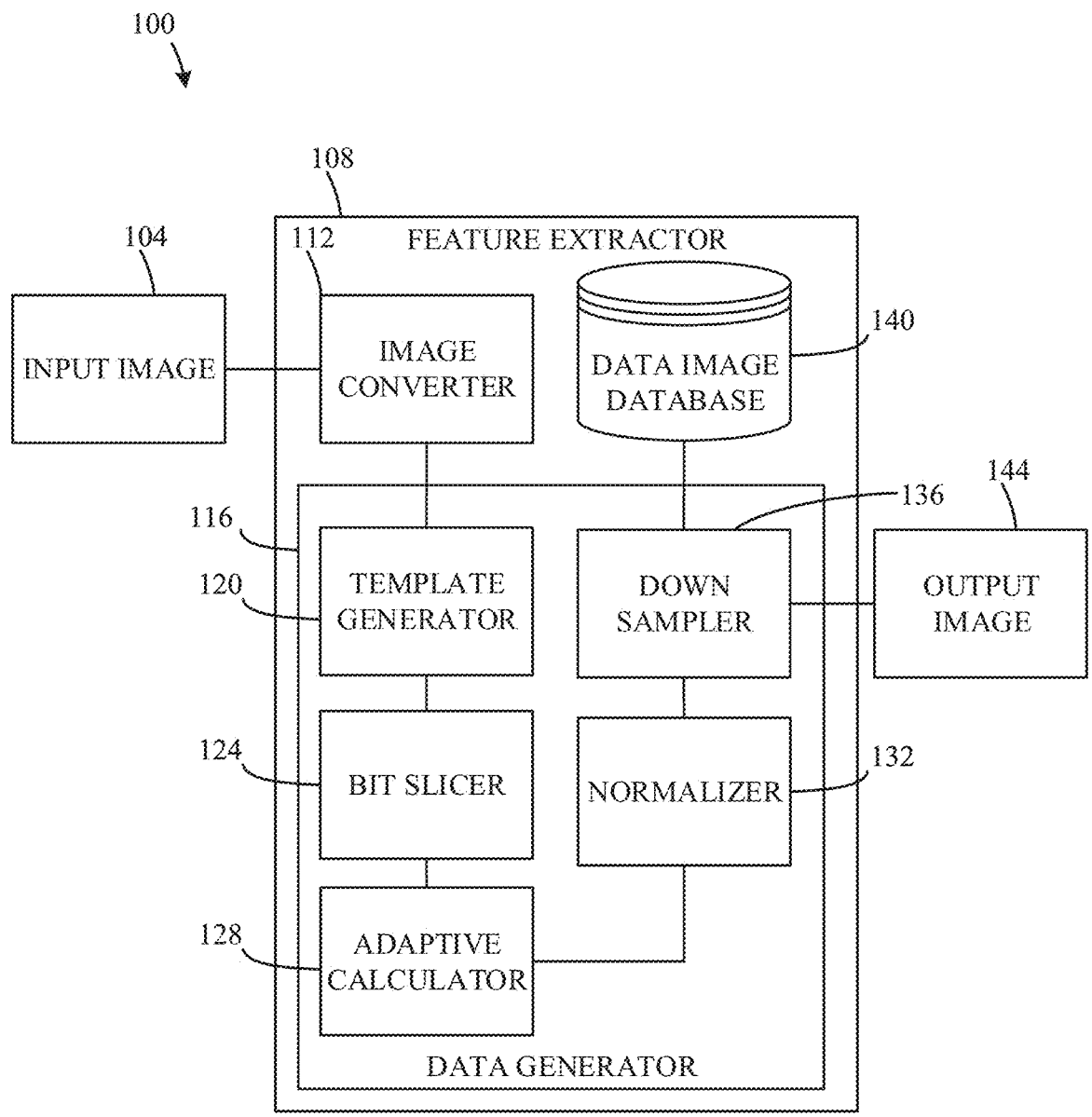
FIG. 1 is a schematic block diagram representation of an example implementation of a feature extractor constructed in accordance with the teachings of this disclosure.

FIG. 1 is a schematic block diagram representation of an example texture extractor 100 to extract shape features (e.g., nano features) from an input image based on one or more structural angle templates (e.g., shape templates). The example texture extractor 100 retrieves or otherwise receives an input image 104 and includes an example feature extractor 108, an example image converter 112, an example data generator 116, an example template generator 120, an example bit slicer 124, an example adaptive calculator 128 (e.g., a Gaussian calculator), an example normalizer 132, an example down sampler 136, and an example data image database 140. As described in further detail below, the example texture extractor 100 produces, generates, and/or otherwise identifies an output image 144 in a manner improved over existing and known techniques (e.g., Sobel edge detection, Canny edge detection, etc.). The example texture extractor 100 extracts one or more features of the input image 104 and saves the features to the image database 140. The saved features can be used to compare the input image 104 to another image in the database and determine whether the two images satisfy a similarity threshold based on the features of the two images.

The input image 104 can be any image of any size. The input image 104 may be received and/or otherwise retrieved by the feature extractor 108 through user input, data collection, or any other means.

The example texture extractor 100 includes the example feature extractor 108 to, in part, extract features (e.g., nano features) of the input image 104. In some examples, the features include an object in the input image 104 and/or one or more details of the object. For example, a feature of the object may include an edge of the object. The example feature extractor 108 identifies one or more features in the input image 104, assigns the corresponding feature a value, and determines a total value for the input image 104 based on the feature values. In some examples, the feature extractor 108 groups pixels of the input image into windows (e.g., matrices) to form a grid. For example, the feature extractor 108 may group the pixels of the input image into 3×3 windows and determine a value for each of the nine pixels of a 3×3 window based on the features within the window. The feature extractor 108 determines a window value for the 3×3 pixel window based on the values for each pixel within the window and calculates a vector for the input image 104 based on the window values of the aggregated 3×3 matrices. The feature extractor 108 saves the vector of the input image 104 to a database, memory, or any other computer storage device for later analysis. For instance, the example feature extractor 108 may compare the features of the input image 104 with saved features of a different image to determine if the two images satisfy a similarity threshold.

In some examples, the example feature extractor 108 includes the example image converter 112 to convert the input image 104 into a black-and-white image. In some examples, the image converter 112 converts the colors of the input image 104 into grayscale values.

The example feature extractor 108 includes the example data generator 116 to receive and/or otherwise retrieve the black-and-white image output from the image converter 112 and calculate values for the input image 104 based on one or more features of the image. The data generator 116 saves the values to the data image database 140 and outputs an output image 144 that includes the one or more features discovered in the input image 104.

The example data generator 116 includes the example template generator 120 to generate a set of templates (e.g., shape templates). In some examples, a shape template is a square matrix that includes a plurality of elements (e.g., a 3×3 square matrix that includes nine elements). The elements may include values that correspond to the color of the element. For example, a value of 1 may indicate the element is to be colored white, and a value of 0 may indicate the element is to be colored black. In some examples, the set of shape templates includes 83 shape templates, but examples disclosed herein are not limited thereto and the shape templates may include any value for any color, any size matrix, and any number of shape templates in the set. In some examples, the template generator 120 generates rotation matrices based on the template matrices. In some examples, the template generator 120 generates rotation matrices for multiple possible rotations of the template matrices. In some examples, each rotation matrix is multiplied together using dot matrix multiplication to generate a template value for each shape template, as discussed in further detail below. These template values are saved to a set of template values to be compared to windows in the input image 104.

The data generator 116 includes the example bit slicer 124 to process the input image 104 (e.g., grayscale, color, black and white) as input. The bit slicer 124 identifies the 8-bit value for each pixel in the input image 104 and determines a window size based on the template matrix size and/or the size of the input image 104. For example, if the template matrices are 3×3 matrices, the bit slicer 124 may determine the window size to be 3 pixels by 3 pixels. In some examples, the number of rows and columns of pixel windows in the input image 104 is a multiple of the window size to fit the pixel windows evenly into the image. In this example, the windows are square windows (e.g., 3×3 pixels), but examples disclosed herein are not limited thereto.

The example bit slicer 124 performs bit-wise computations to detect features (e.g., edges) in the input image 104. Whereas previous edge-detection techniques are susceptible to missing edges in low-quality portions of an image (e.g., portions of an image subject to overbrightness, high contrast, or blurring), examples disclosed herein perform bit-wise computations (e.g., bit-wise OR operations and bit-wise AND operations) to extract as much information as possible from an input image 104, including information in blurry, overbright, or high contrast portions of the input image 104.

In some examples, the bit slicer 124 generates one or more bit slices. In some examples, a bit slice is a matrix including a plurality of elements. In some examples, the bit slice matrix is the same as the window size (e.g., a 3×3 matrix). In some examples, the bit slicer 124 generates a plurality of OR bit slices and a plurality of AND bit slices based on a corresponding bit-wise OR operation and a corresponding bit-wise AND operation. In some examples, an OR bit slice and an AND bit slice are output to the example adaptive calculator 128.

The data generator 116 includes an example adaptive calculator 128. The adaptive calculator 128 receives and/or otherwise retrieves input from the bit slicer 124 including an OR bit slice and an AND bit slice. The adaptive calculator 128 adds together the OR bit slice and the AND bit slice to generate a fused matrix. The adaptive calculator 128 determines the edges of the objects in the input image 104 based on the fused matrix. In some examples, the adaptive calculator 128 identifies the edges of objects by distinguishing between 0's and 1's in the fused matrix. In some examples, the presence of the value 1 signals the presence of an edge. In some examples, the adaptive calculator 128 generates a fused image by converting the values of the fused matrix to binary numbers (e.g., 8-bit binary numbers). In some examples, the adaptive calculator 128 converts the values of the fused matrix to binary numbers by applying an adaptive Gaussian threshold to the values of the fused matrix. In some examples, the fused image is divided into pixel windows (e.g., 3×3 pixel windows). The adaptive calculator 128 outputs the fused image with identified edges to an example normalizer 132.

The example normalizer 132 receives and/or otherwise retrieves the fused image with identified edges from the adaptive calculator 128 and iterates through each row and column of pixel windows in the fused image to calculate a normalized value for each pixel window based on the values of the pixels in the window. As described above, in some examples, each pixel window is a 3×3 matrix including nine elements, with each element including a binary value (e.g., an 8-bit value). In some examples, the binary value indicates that a pixel is colored either white or black. In some examples, the normalizer 132 generates a normalized value for each pixel window by calculating the average of the nine binary values of the pixels in each pixel window. The normalizer 132 outputs an array including the normalized values to an example down sampler 136.

The example down sampler 136 receives and/or otherwise retrieves an array including normalized values from the normalizer 132. The down sampler 136 iterates through the array of normalized values and further reduces the total number of normalized values to a down-sampled vector. In some examples, the down sampler 136 generates a vector of down-sampled values by calculating an average value for each row and column in the array of normalized data. In this example, the vector of down-sampled values is saved to a database and output by the data generator 116.

The feature extractor 108 includes an example data image database 140 to receive the vector of down-sampled values from the down sampler 136 as input and save the values generated by the data generator 116. The example image database 140 may be any type of database, memory, or any other computer-readable medium. In some examples, a user can access the data image database 140 to find images that satisfy a similarity threshold with a given input image 104.

The texture extractor 100 produces and/or outputs an example output image 144 based on the input image 104. In some examples, the output image 144 is a black-and-white image with features (e.g., edges and/or shapes of objects) identified by the example texture extractor 100. In some examples, the output image 144 is based on the vector of down-sampled values generated by the down sampler 136. As described in further detail below, the output image 144 includes features, such as edges and shapes of objects within objects, at a higher level of detail than previous techniques. For example, previous techniques (e.g., the Canny algorithm) are susceptible to missing details in portions of images that are subject to overbrightness, high contrast, or blurring, which results in missing feature information. Examples disclosed herein perform bit-wise computations to identify features in an image with higher accuracy than previous techniques. An example output image 144 is described in further detail below in connection with FIG. 8.

Figure 2:
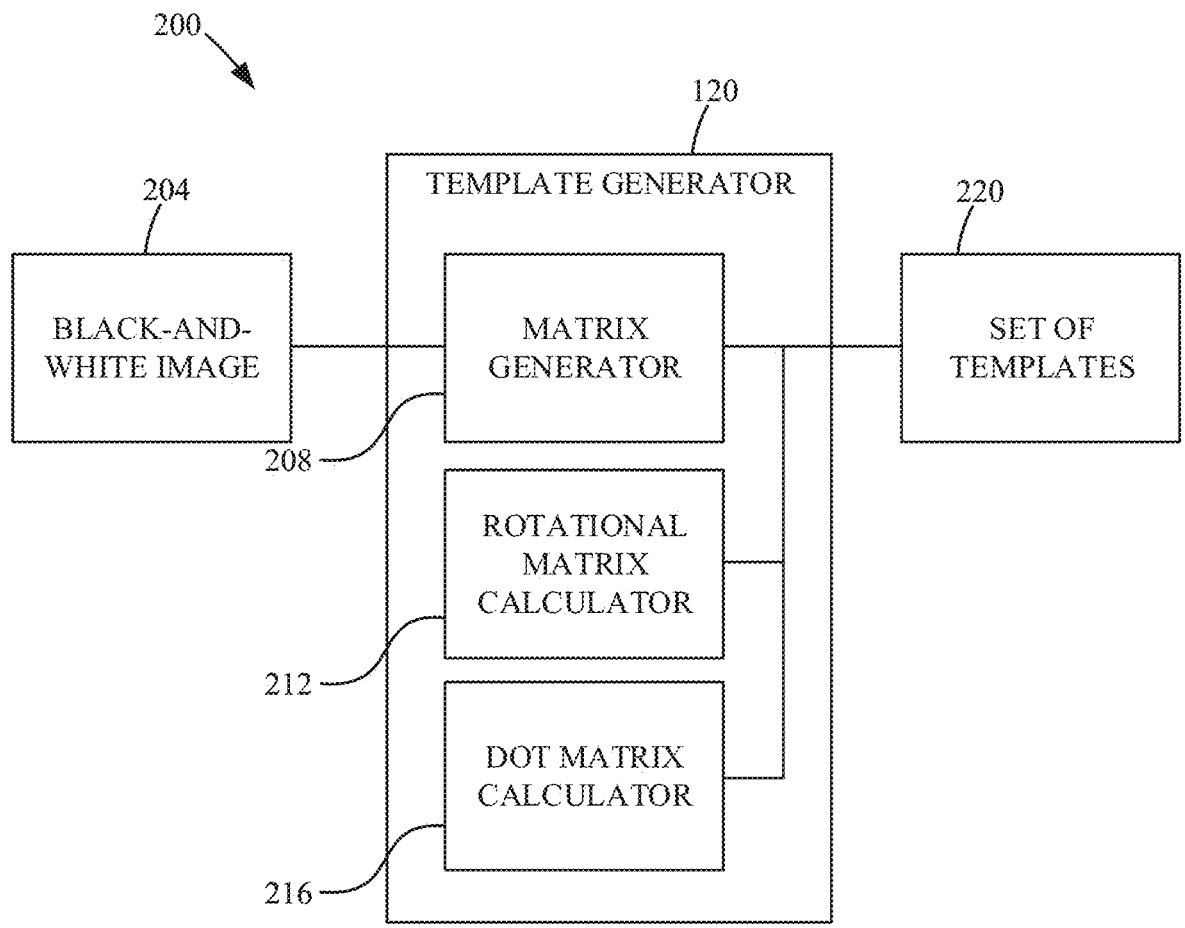
FIG. 2 is a schematic block diagram representation of an example implementation of a template generator of FIG. 1.

FIG. 2 is a schematic block diagram representation of an example implementation of a template generator 120 of FIG. 1. The template generator 120 includes an example matrix generator 208, an example rotational matrix calculator 212, and an example dot matrix calculator 216. In some examples, the data generator 116 receives a black-and-white image 204 as input. In some examples, the data generator 116 outputs a set of shape templates 220 based on the black-and-white image 204.

The example matrix generator 208 of FIG. 2 generates the example set of shape templates 220. The shape templates 220 are matrices (e.g., square matrices) that include a plurality of elements, each element of the matrix including a value. In some examples, a value of 1 in a matrix element indicates the element is to be colored white and a value of 0 in a matrix element indicates the element is to be colored black. In some examples, the shape template matrices are 3×3 matrices. In some examples, the set includes 83 shape template matrices. The example can be structured with any value for any color, any size square matrix, and any number of shape templates in the set.

The example rotational matrix calculator 212 of FIG. 2 receives a shape template matrix from the set of shape template matrices generated by the matrix generator 208 and generates one or more rotated matrices based on the shape template matrix (e.g., a first rotated matrix may be generated by rotating the template matrix 90 degrees, a second rotated matrix may be generated by rotating the template matrix 180 degrees, and a third rotated matrix may be generated by rotating the template matrix 270 degrees). The rotational matrix calculator 212 saves the rotated matrices corresponding to the shape template matrix to a set of rotated matrices.

The example dot matrix calculator 216 of FIG. 2 receives and/or otherwise retrieves one or more rotated matrices from the set of rotated matrices from the rotational matrix calculator 212 and generates a template value by calculating the dot product of the rotated matrices corresponding to the shape template. The template value of the corresponding shape template matrix is saved to the set of shape templates.

The data generator 116 outputs the set of shape templates to the data image database 140. In this example, the set of shape templates includes the template matrices, the rotated template matrices, and the template values.

Figure 3:
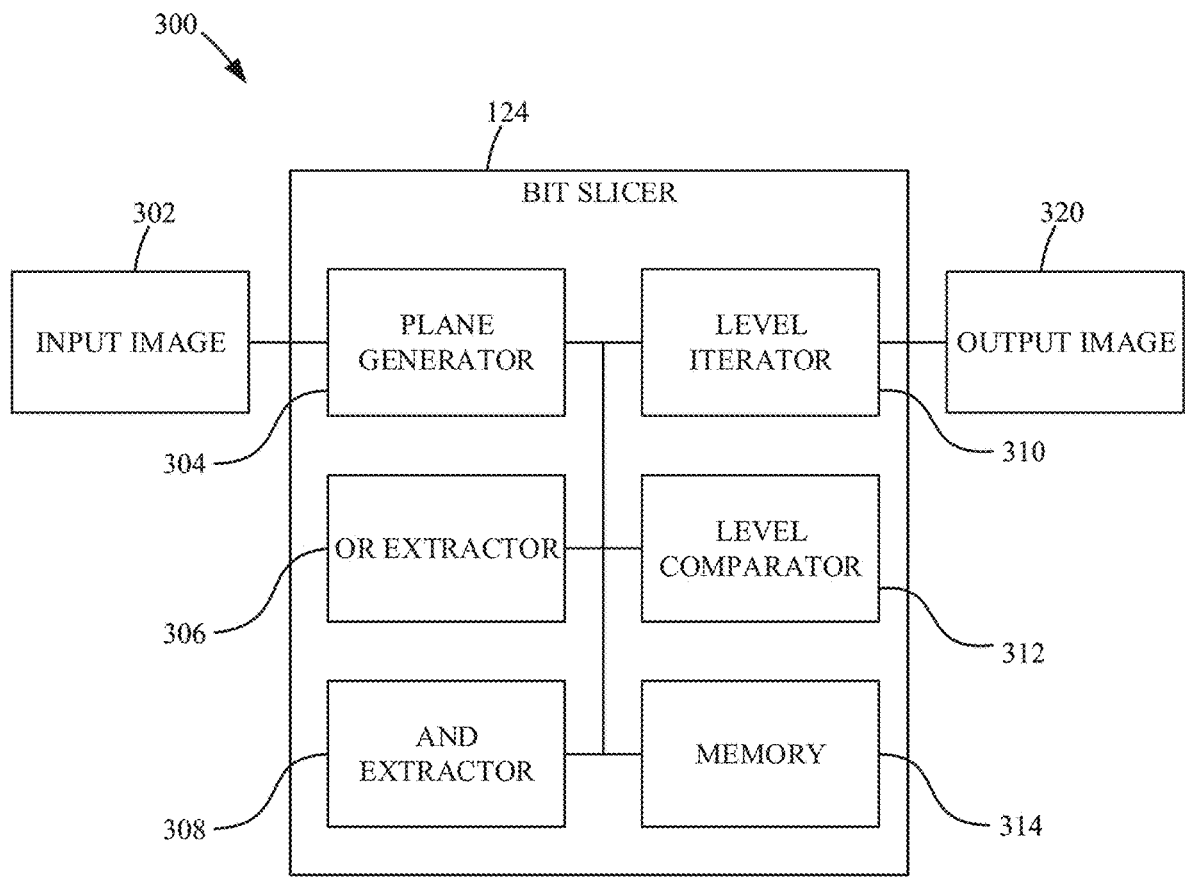
FIG. 3 is a schematic block diagram representation of an example implementation of a bit slicer of FIG. 1.

FIG. 3 is a schematic block diagram representation of an example implementation of the example bit slicer 124 of FIG. 1. The example bit slicer 124 includes an example plane generator 304, an example OR extractor 306, an example AND extractor 308, an example level iterator 310, and an example level comparator 312, and an example memory 314. In some examples, the example bit slicer 124 generates an output image 320 (e.g., a fused matrix) based on an input image 302.

The example input image 302 of FIG. 3 can be any size, color range, or resolution. In some examples, the input image 302 is a grayscale image. The example bit slicer 124 of FIG. 3 receives and/or otherwise retrieves the input image 302. Each pixel in the input image 302 is represented by a pixel value. In some examples, one or more pixel values are converted to binary form (e.g., 8-bit binary numbers).

The example plane generator 304 generates a matrix (e.g., a plane matrix) that includes a plurality of values. In some examples, the plane matrix is the same size as the input image 302 (e.g., if the size of the input image 302 is M×N, where M corresponds to the number of rows in the input image and N corresponds to the number of columns in the input image, then size of the plane matrix is also M×N). In some examples, each element of the plane matrix has the same value (e.g., each element has a value of 1). For example, if the input image 302 is 3×3 pixels, the example plane generator 304 may generate a 3×3 plane matrix having nine elements each with a value of 1. In some examples, the values are represented in binary form (e.g., a value of 1 is represented as 00000001 in binary form). In some examples, the values are represented in decimal form and converted to binary form.

In some examples, the example plane generator 304 generates a plurality of plane matrices each having a plurality of elements. In some examples, each plane matrix corresponds to a different value. In some examples, each element of a plane matrix has the same value. For example, the example plane generator 304 may generate a first plane matrix (e.g., M[0]) having a plurality of elements with a value of 1, a second plane matrix (e.g., M[1]) having a plurality of elements with a value of 2, a third plane matrix (e.g., M[2]) having a plurality of elements with a value of 4, a fourth plane matrix (e.g., M[3]) having a plurality of elements with a value of 8, a fifth plane matrix (e.g., M[4]) having a plurality of elements with a value of 16, a sixth plane matrix (e.g., M[5]) having a plurality of elements with a value of 32, a seventh plane matrix (e.g., M[6]) having a plurality of elements with a value of 64, and an eighth plane matrix (e.g., M[7]) having a plurality of elements with a value of 128.

The example OR extractor 306 generates an OR bit slice by performing an OR comparison between the input image 302 and one or more plane matrices generated by the plane generator 304. In some examples, the example OR extractor 306 performs an OR comparison between each pixel in the input image 302 and each corresponding element of a plane matrix. For example, the example OR extractor may perform an OR comparison between the binary value of the first pixel of the input image 302 and the binary value of the first element of the plane matrix. In some examples, the example OR extractor 306 performs an OR comparison by performing an OR operation on a bit of the pixel value and a corresponding bit of the element value. For example, the example OR extractor 306 may perform an OR comparison between an 8-bit pixel value of 00001100 (e.g., a value of 12 in decimal form) and an 8-bit element value of 00000001 (e.g., a value of 1 in decimal form) to produce a result of 00001101.

The example OR extractor 306 performs an OR comparison between each pixel in the input image 302 and each corresponding element in a plane matrix to generate an OR bit slice. The OR bit slice is a matrix that includes the results of each OR comparison. In some examples, the OR bit slice is the same size as the input image 302 and the plane matrix (e.g., M×N) and each element of the OR bit slice is the result of a corresponding OR operation between a pixel in the input image and an element in the plane matrix. For example, the first element of the OR bit slice matrix in the example above may be 00001101 (e.g., an OR comparison between the 8-bit pixel value 00001100 of the first pixel of the input image 302 and the 8-bit element value 00000001 of the first element of the plane matrix).

In some examples, the example OR extractor 306 generates a plurality of OR bit slices (e.g., the plurality of OR bit slices 602 illustrated in FIG. 6) by performing an OR comparison between the input image 302 and the plane matrices generated by the example plane generator 304. For example, the example OR extractor 306 may generate a first OR bit slice (e.g., bit slice OR[0] 604 of FIG. 6) by performing an OR comparison between each pixel in the input image 302 and each corresponding element of the first plane matrix (e.g., M[0]) and generate a second OR bit slice (e.g., bit slice OR[1] 606 of FIG. 6) by performing an OR comparison between each pixel in the input image 302 and each corresponding element of the second plane matrix (e.g., M[1]). In some examples, the example OR extractor 306 generates eight OR bit slices (e.g., the OR bit slices OR[0]-OR[7] 602 illustrated in FIG. 6) by performing an OR comparison between the input image 302 and each of the plurality of plane matrices (e.g., M[0]-M[7]).

The example AND extractor 308 of FIG. 3 receives the input image 302 and generates an AND bit slice by performing an AND comparison between the input image 302 and a plane matrix generated by the example plane generator 304. In some examples, the example AND extractor 308 performs an AND comparison between each pixel in the input image 302 and each corresponding element of the plane matrix. For example, the example AND extractor 308 may perform an AND comparison between the binary value of the first pixel of the input image 302 and the binary value of the first element of the plane matrix. In some examples, the example AND extractor 308 performs an AND comparison by performing an AND operation on a bit of the pixel value and a corresponding bit of the element value. For example, the example AND extractor 308 may perform an AND comparison between an 8-bit pixel value of 00001100 (e.g., a value of 12 in decimal form) and an 8-bit element value of 00000001 (e.g., a value of 1 in decimal form) to produce a result of 00000000.

The example AND extractor 308 performs an AND comparison between each pixel in the input image 302 and each corresponding element in a plane matrix to generate an AND bit slice. The AND bit slice is a matrix that includes the results for each corresponding AND comparison. In some examples, the AND bit slice is the same size as the input image 302 and plane matrix (e.g., M×N). For example, the first element of the AND bit slice matrix in the above example may be 00000000 (e.g., the result of an AND comparison between the 8-bit pixel value 00001100 of the first pixel of the input image 302 and the 8-bit element value 00000001 of the first element of the plane matrix).

In some examples, the example AND extractor 308 generates a plurality of AND bit slices (e.g., the plurality of AND bit slices 608 illustrated in FIG. 6) by performing an AND comparison between the input image 302 and each plane matrix. For example, the example AND extractor 308 may generate a first AND bit slice (e.g., bits slice AND[0] 610 of FIG. 6) by performing an AND comparison between each pixel in the input image 302 and each corresponding element of the first plane matrix (e.g., M[0]) and generate a second AND bit slice (e.g., bit slice AND[1] 612 of FIG. 6) by performing an AND comparison between each pixel in the input image 302 and each corresponding element of the second plane matrix (e.g., M[1]). In some examples, the example AND extractor 308 generates eight AND bit slices (e.g., the AND bit slices AND[0]-AND[7] 608 of FIG. 6) by performing an AND comparison between the input image 302 and each plane matrix (e.g., M[0]-M[7]).

The example level iterator 310 of FIG. 3 increases a level value by an iteration amount. In some examples, the level value corresponds to a bit position of a binary number being evaluated by the OR extractor 306 and/or the AND extractor 308. For example, a level value of 1 may correspond to a first bit position of a binary number, a level value of 2 may correspond to a second bit position of a binary number, and so on. In some examples, the example level iterator 310 increases the level value by an iteration amount of 1 each time a bit position is evaluated by the example OR extractor 306 and/or the example AND extractor 308. For example, the example level iterator 310 may increase the level value by an amount of 1 after the example OR extractor 306 performs an OR comparison between the first bit of a pixel value and the first bit of a corresponding element value. After increasing the level value, the level iterator sends the level value to the value comparator 316.

The example level comparator 312 of FIG. 3 determines whether the level value is less than, equal to, or greater than a pre-determined end value. In some examples, the end value is based on the size of a binary number (e.g., a binary number corresponding to the pixel size of the input image 302). For example, if the example OR extractor 306 and/or the example AND extractor 308 is performing an OR comparison and/or an AND comparison between an 8-bit pixel value and an 8-bit element value, then the end value may be set to eight so that all corresponding bits of the 8-bit values are evaluated. In these examples, the example level comparator 312 determines whether the level value is equal to a pre-determined end value. If the example level comparator 312 determines the level value is equal to the end value (e.g., the level comparator determines that the level value is equal to an end value of eight), then the example level comparator 312 sends an OR bit slice and/or an AND bit slice to the adaptive calculator 128 of FIG. 1. In some examples, the example bit slicer sends the $0^{th}$ OR bit slice (e.g., OR[0] illustrated in FIG. 6) and the $6^{th}$ AND bit slice (e.g., AND[ ] illustrated in FIG. 7) to the example adaptive calculator 128 of FIG. 1. In some examples, the example adaptive calculator 128 combines the OR bit slice matrix with the AND bit slice matrix by adding the first OR bit slice matrix and the sixth AND bit slice matrix together to generate a fused image. In some examples, the first OR bit slice has the lowest contrast and highest gradient of the OR bit slices and the sixth AND bit slice has the highest contrast and lowest gradient of the AND bit slices. The example adaptive calculator 128 sends the fused image to the example normalizer 132 illustrated in FIG. 1.

The example memory 314 of FIG. 3 can be any sort of computer readable storage medium. In some examples, the memory receives one or more input images, one or more plane matrices, a plurality of pixel values (e.g., in binary or decimal form) corresponding to an input image, a plurality of element values (e.g., in binary or decimal form) corresponding to a plane matrix, one or more OR bit slices, one or more AND bit slices, and/or one or more level values and/or end values.

Figure 4:
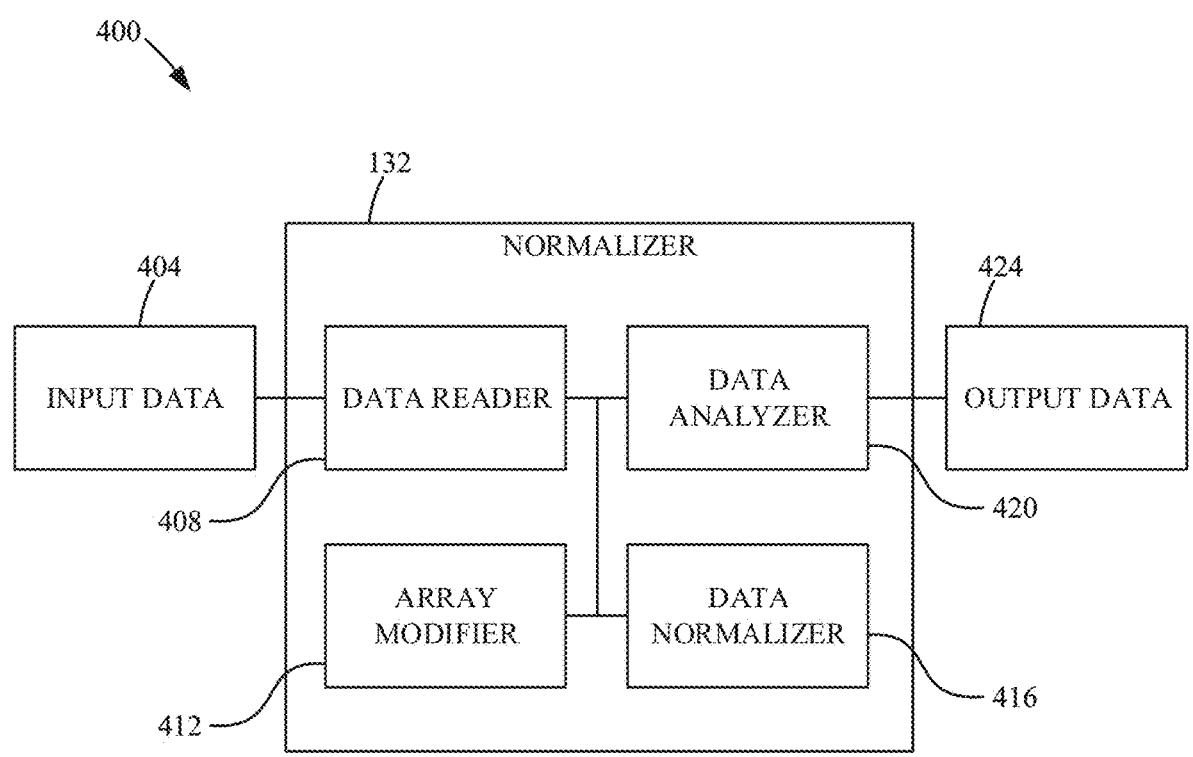
FIG. 4 is a schematic block diagram representation of an example implementation of a normalizer of FIG. 1.
Figure 5A:
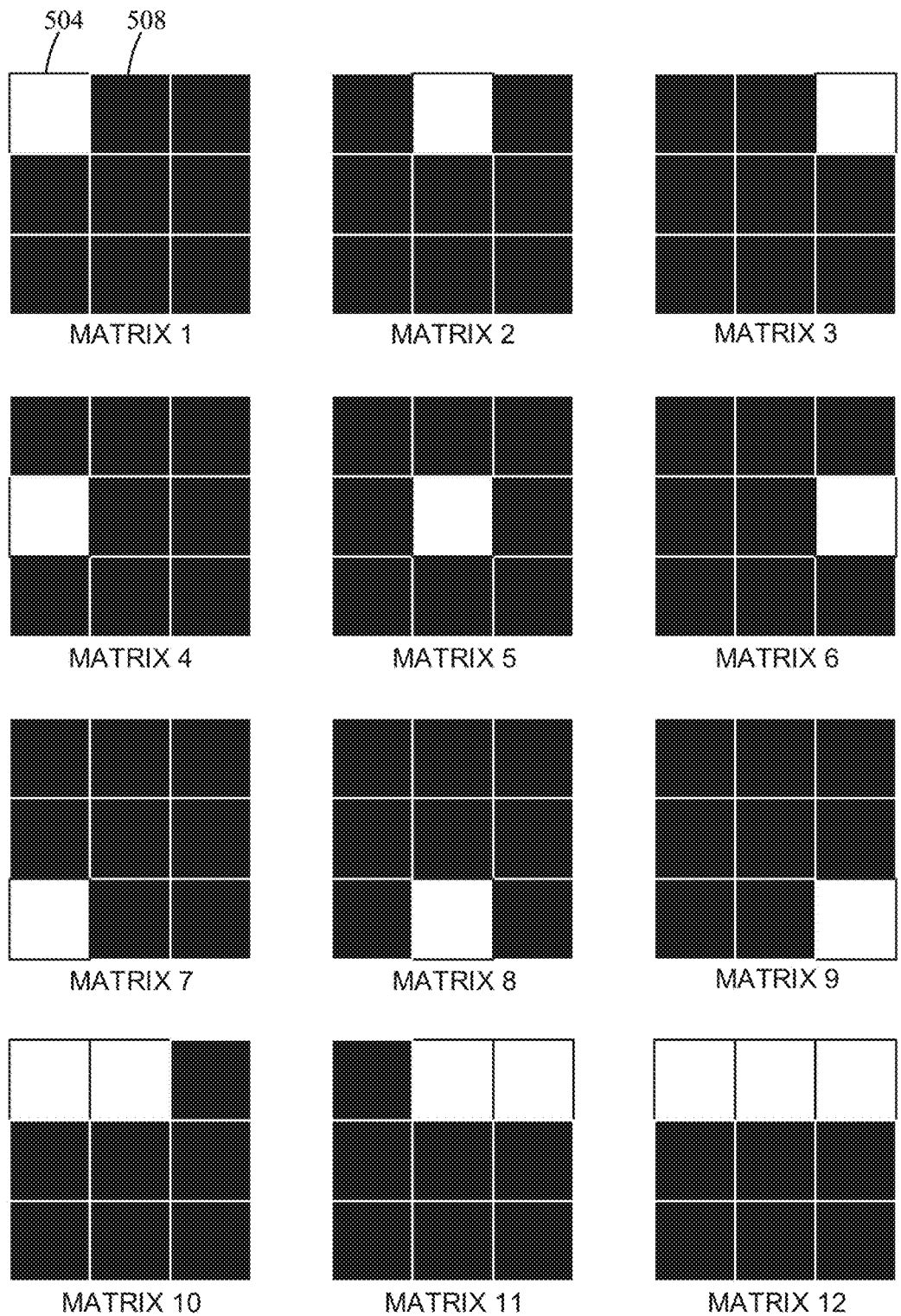
FIGS. 5a through 5g are block representations of shape templates utilized by the example feature extractor of FIG. 1.
Figure 5B:
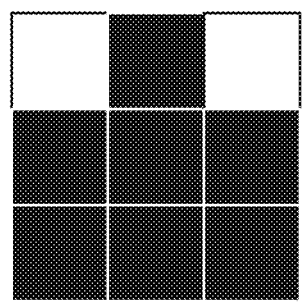
Figure 5B:
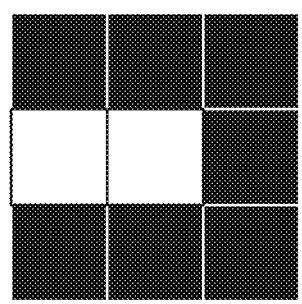
Figure 5B:
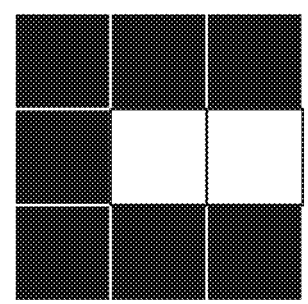
Figure 5B:
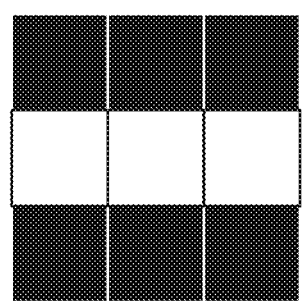
Figure 5B:
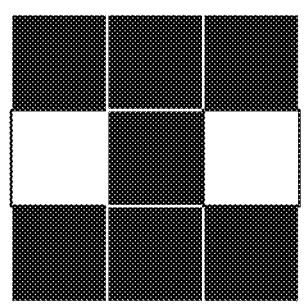
Figure 5B:
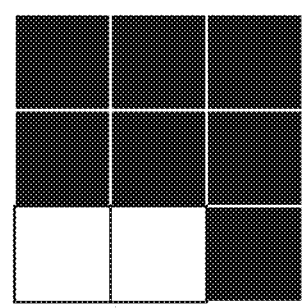
Figure 5B:
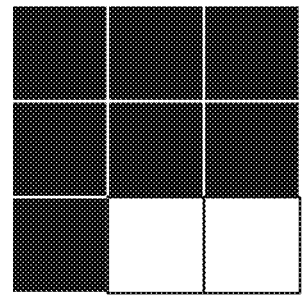
Figure 5B:
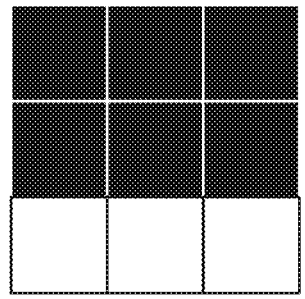
Figure 5B:
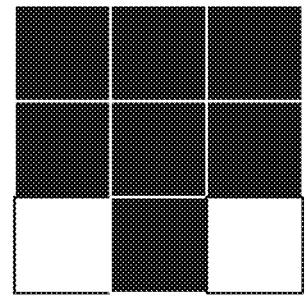
Figure 5B:
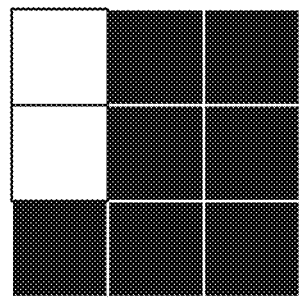
Figure 5B:
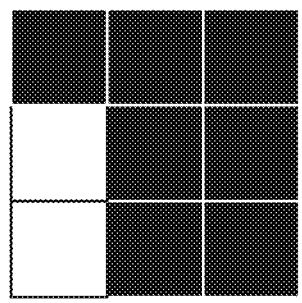
Figure 5B:
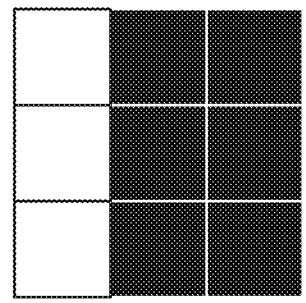
Figure 5C:
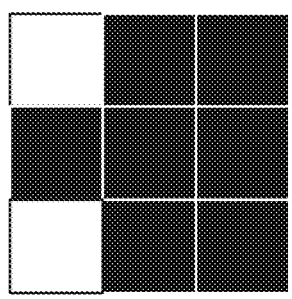
Figure 5C:
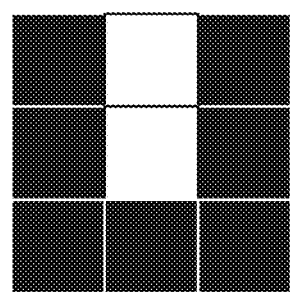
Figure 5C:
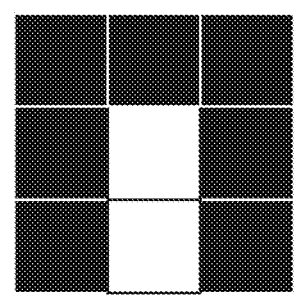
Figure 5C:
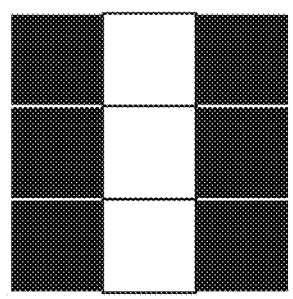
Figure 5C:
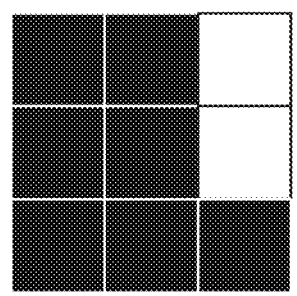
Figure 5C:
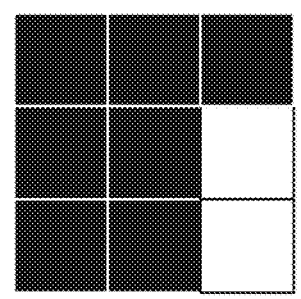
Figure 5C:
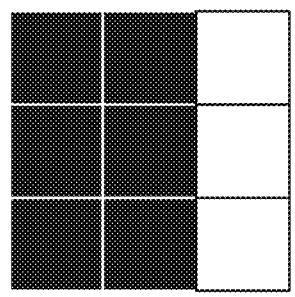
Figure 5C:
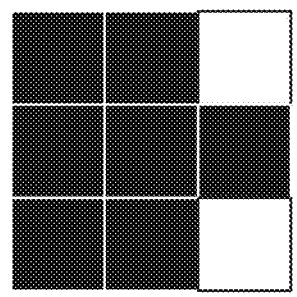
Figure 5C:
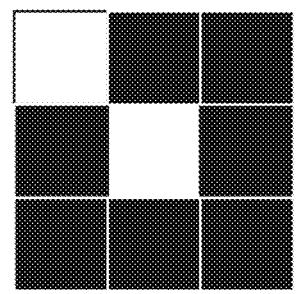
Figure 5C:
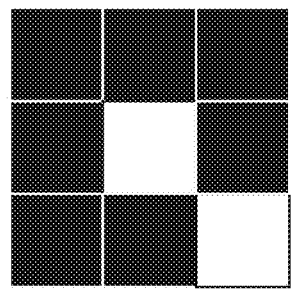
Figure 5C:
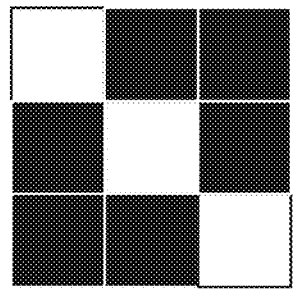
Figure 5C:
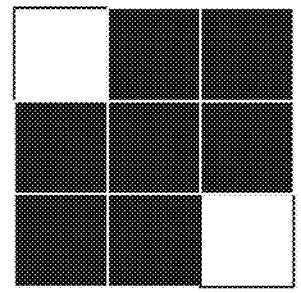
Figure 5D:
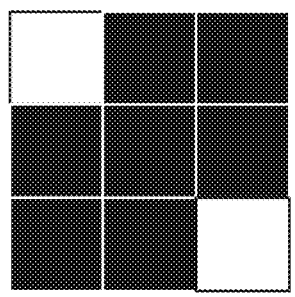
Figure 5D:
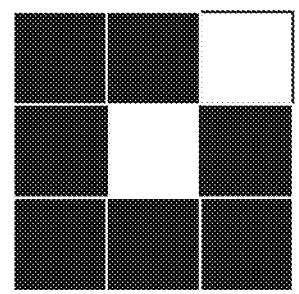
Figure 5D:
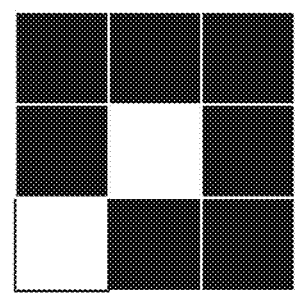
Figure 5D:
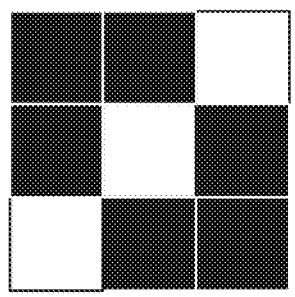
Figure 5D:
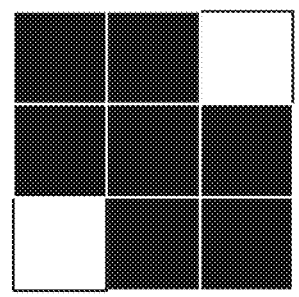
Figure 5D:
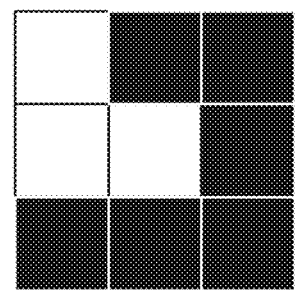
Figure 5D:
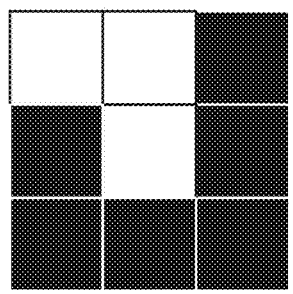
Figure 5D:
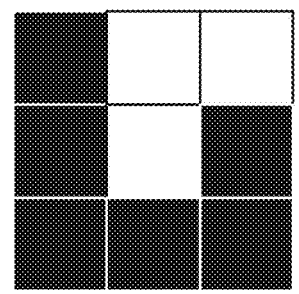
Figure 5D:
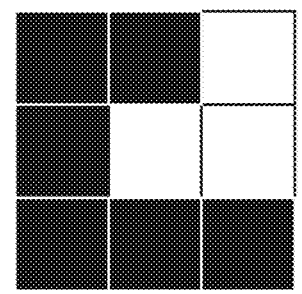
Figure 5D:
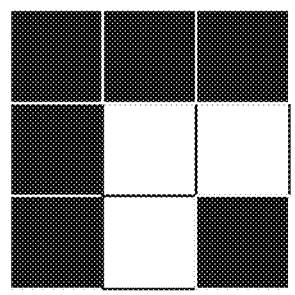
Figure 5D:
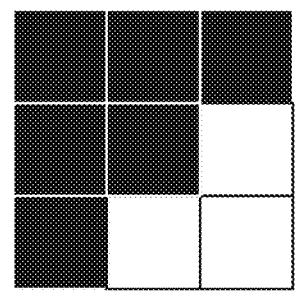
Figure 5D:
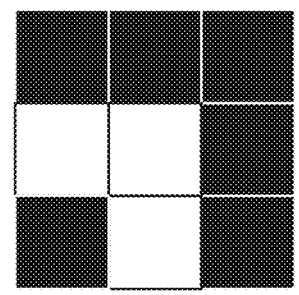
Figure 5E:
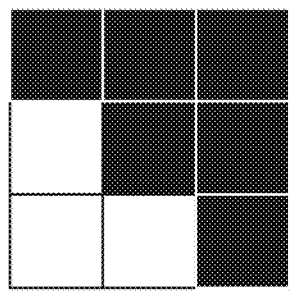
Figure 5E:
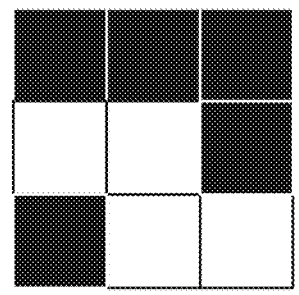
Figure 5E:
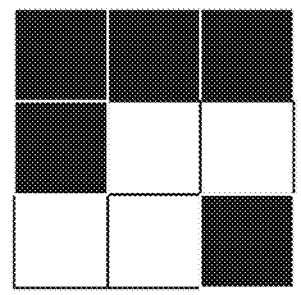
Figure 5E:
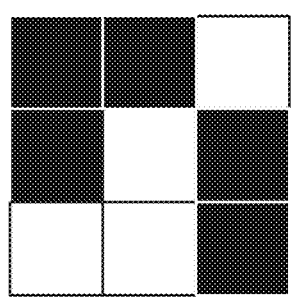
Figure 5E:
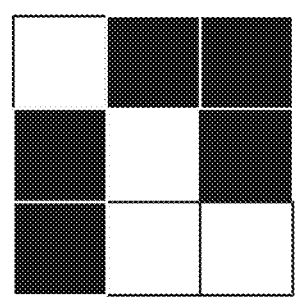
Figure 5E:
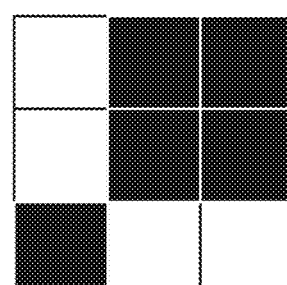
Figure 5E:
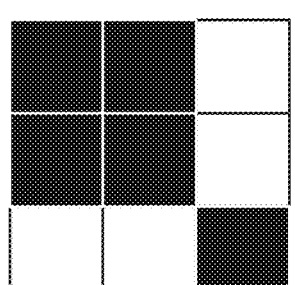
Figure 5E:
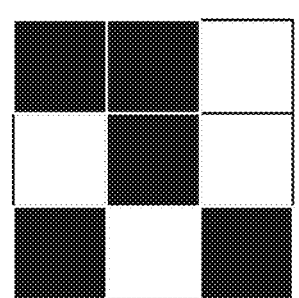
Figure 5E:
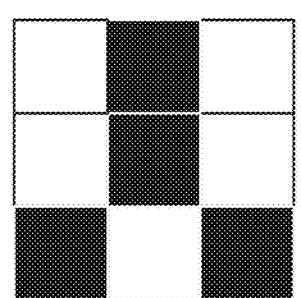
Figure 5E:
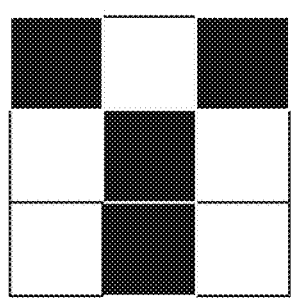
Figure 5E:
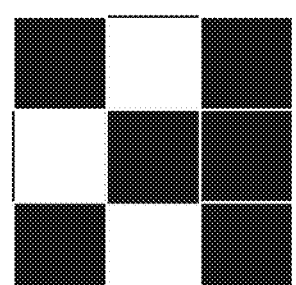
Figure 5E:
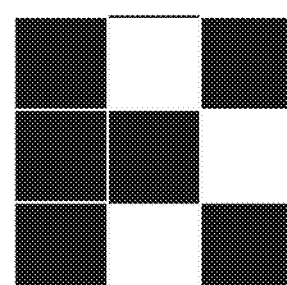
Figure 5F:
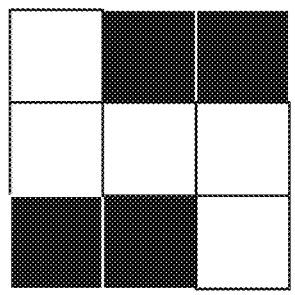
Figure 5F:
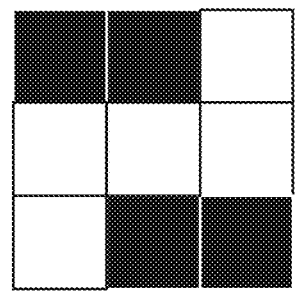
Figure 5F:
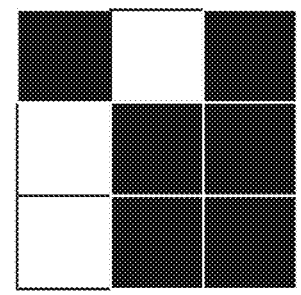
Figure 5F:
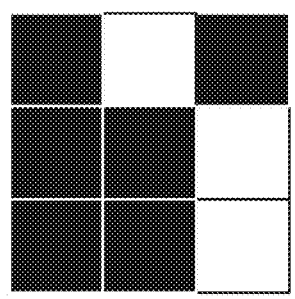
Figure 5F:
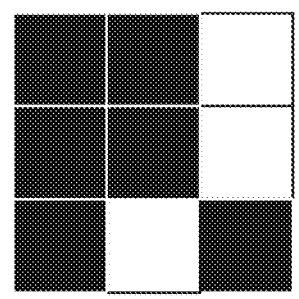
Figure 5F:
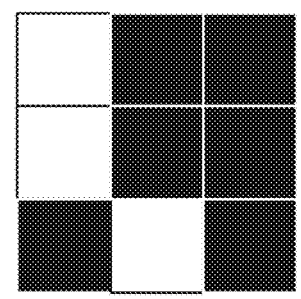
Figure 5F:
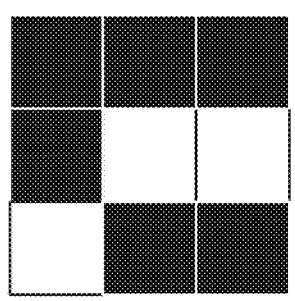
Figure 5F:
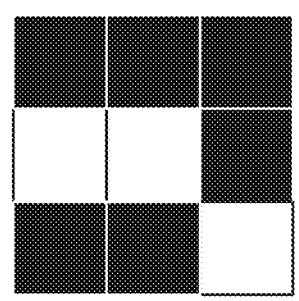
Figure 5F:
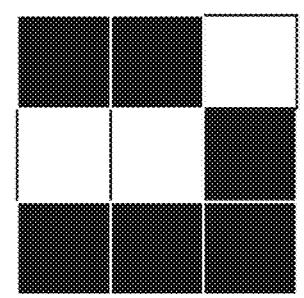
Figure 5F:
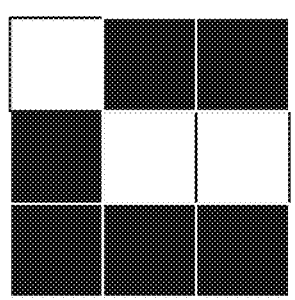
Figure 5F:
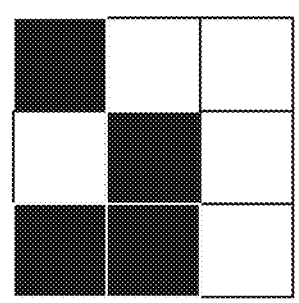
Figure 5F:
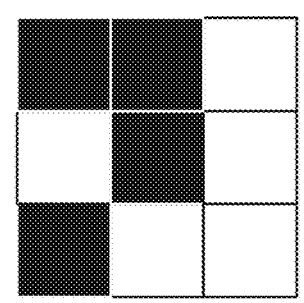
Figure 5G:
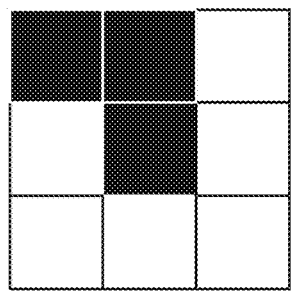
Figure 5G:
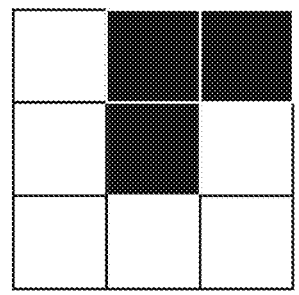
Figure 5G:
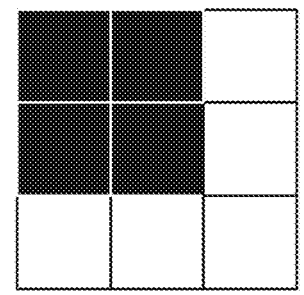
Figure 5G:
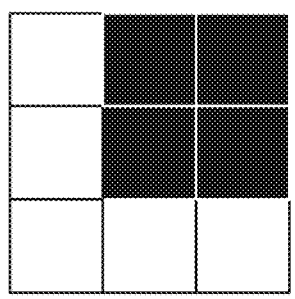
Figure 5G:
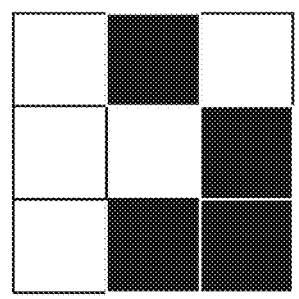
Figure 5G:
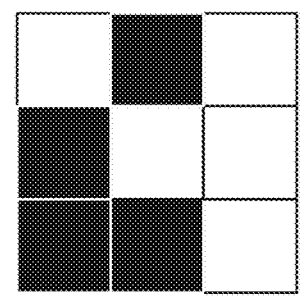
Figure 5G:
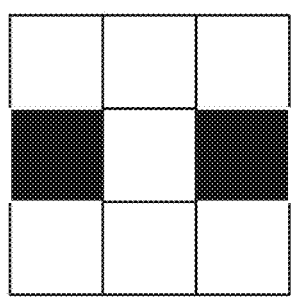
Figure 5G:
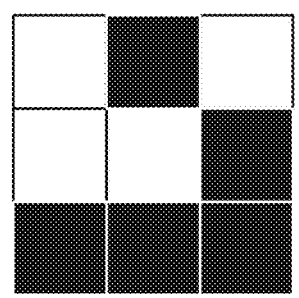
Figure 5G:
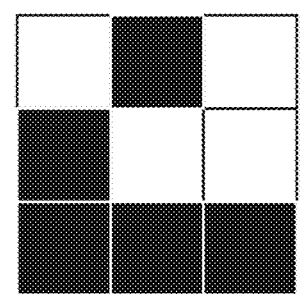
Figure 5G:
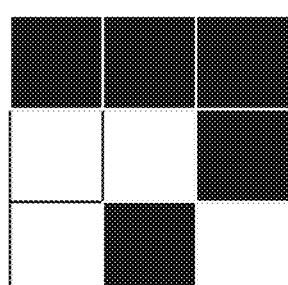
Figure 5G:
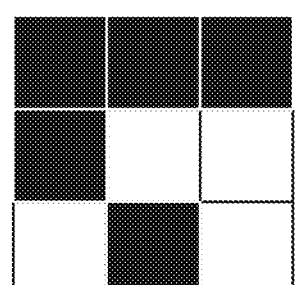

FIG. 4 is a schematic block diagram representation of an example implementation of a normalizer of FIG. 1. The normalizer 132 includes an example data reader 408 communicatively coupled to input data 404, an example array modifier 412, an example data normalizer 416, and an example data analyzer 420 to generate output data 424.

In some examples, the normalizer 132 calculates the average of values in a pixel window to generate a normalized window value. For example, the normalizer 132 may calculate the average of nine, one-bit values corresponding to the pixels of each 3×3 pixel window to generate a normalized window value. The normalizer 132 outputs an array containing the normalized window values to an example down sampler 136.

The normalizer 132 receives input data 404 from the adaptive calculator 128. In some examples, the input data 404 includes a black-and-white image. In some examples, the input data 404 includes an array of values for the input image 104. In these examples, the normalizer 132 calculates average values for the input data 404. For example, the example normalizer 132 may calculate the average of one-bit pixel values in a pixel window to generate a normalized value corresponding to the window. By reducing the number of pixel window values (e.g., nine values for a 3×3 window) to a single normalized value, the normalizer 132 reduces the size of the output data 424 to less than the size of the input data 404. Reducing the total number of values in the data saves memory space and allows a computer storage device to store more images and/or data.

The example data reader 408 of FIG. 4 receives and/or otherwise retrieves the input data 404 and determines the size of the input data 404. In these examples, if the input data 404 size is greater than zero, the data reader 408 sends the input data 404 to the array modifier 412. For example, if the input data 404 is an array of values, an input data 404 size of zero would indicate an array size of zero. An array size of zero indicates that there is no data within the array. In other words, the data reader 408 determines whether the input data 404 is null. In these examples, if the input data 404 size is equal to zero or the input data 404 is null, the data reader 408 throws an error (e.g., a segmentation fault, a null pointer exception, etc.) and ends the process of feature extraction.

The example array modifier 412 of FIG. 4 constructs and modifies arrays to store normalized data. In some examples, the array modifier 412 receives the input data 404 from the data reader 408. In some examples, the example array modifier creates an empty array configured to store normalized data. In some examples, the array modifier 412 receives normalized data from the data normalizer 416. In these examples, the array modifier 412 appends a normalized data value to the end of the array of normalized data. In these examples, the array modifier 412 removes the data that was normalized by the data normalizer 416 from the input data 404. In these examples, the array modifier 412 sends the altered input data and normalized data to the data analyzer 420.

The example data normalizer 416 of FIG. 4 receives and/or otherwise retrieves the input data 404 from the data reader 408. The data normalizer 416 normalizes a set of data in the input data 404. In these examples, the data normalizer 416 calculates an average value for the nine, 1-bit values in a pixel window. The values in the pixel window are 1-bit values indicating a pixel colored either white or black. In some examples, the data normalizer 416 sends the normalized value and the input data 404 to the array modifier 412.

The example data analyzer 420 of FIG. 4 receives and/or otherwise retrieves an input data 404 array and a normalized data array from the array modifier 412. In some examples, the data analyzer 420 determines the size of the input data 404 array. In these examples, if the data analyzer 420 determines that the size of the input data 404 array is zero (e.g., the input data array has no contents), the data analyzer 420 outputs the normalized data array. In these examples, if the data analyzer 420 determines that the size of the input data 404 array is greater than zero, the data analyzer 420 sends the input data 404 array to the data normalizer 416.

The normalizer 132 outputs an example array of output data 424 (e.g., an array of normalized values). The output data 424 is smaller than the input data 404 which allows for more data to be saved to a computer storage device, and, thus, enables the storage of more images.

FIGS. 5a through 5g are block representations of example shape templates generated by the example template generator 120 and utilized by the example feature extractor 108 of FIG. 1. In some examples, there are 83 shape templates. In some examples, the shape templates are represented by 3×3 matrices each including nine elements. Each element is represented by a 1-bit value indicating whether the element is black or white. In these examples, a white element (e.g., element 504 of FIG. 5a) corresponds to a bit value of 1 and a black element (e.g., element 508 of FIG. 5a) corresponds to a bit value of 0.

Figure 6:
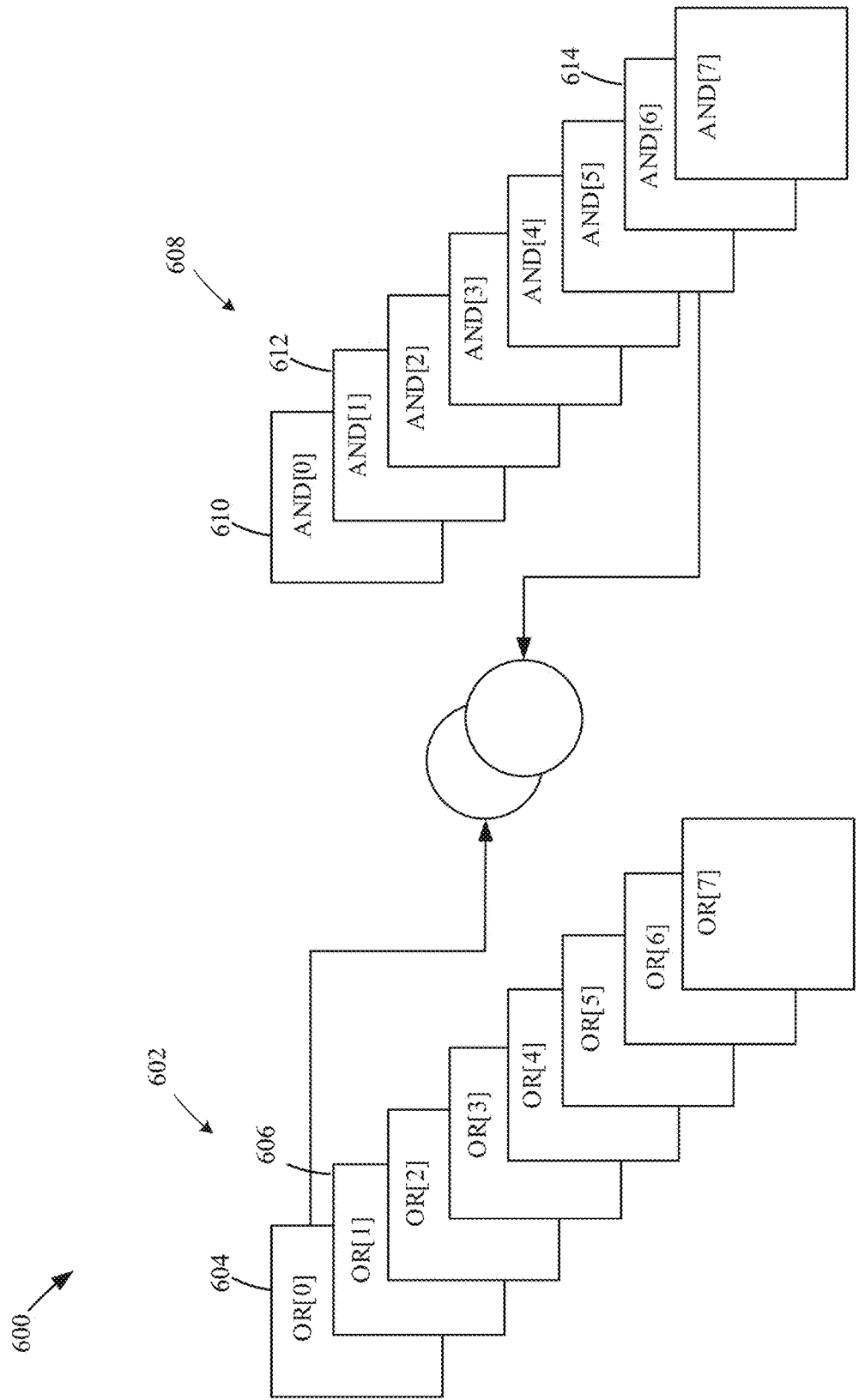
FIG. 6 is a representation of the bit-slicing fusion architecture implemented by the example bit slicer of FIGS. 1 and 3.

FIG. 6 is a representation of the bit-slicing fusion process completed by the example bit slicer 124 of FIGS. 1 and 3 and the adaptive calculator 128 of FIG. 1. FIG. 6 illustrates example OR bit slices 602 (e.g., bit slices OR[0]-OR[7]) and example AND bit slices 608 (e.g., bit slices [AND[0]-AND[7]) The fusion is performed by the adaptive calculator 128 using the 0th OR bit slice (e.g., bit slice OR[0] 604) and the 6$^{th}$ AND bit slice (e.g., bit slice AND[5]) 614). The fusion image is utilized by the adaptive calculator 128, the normalizer 132, and the down sampler 136 to create the output image 144.

Figure 7:
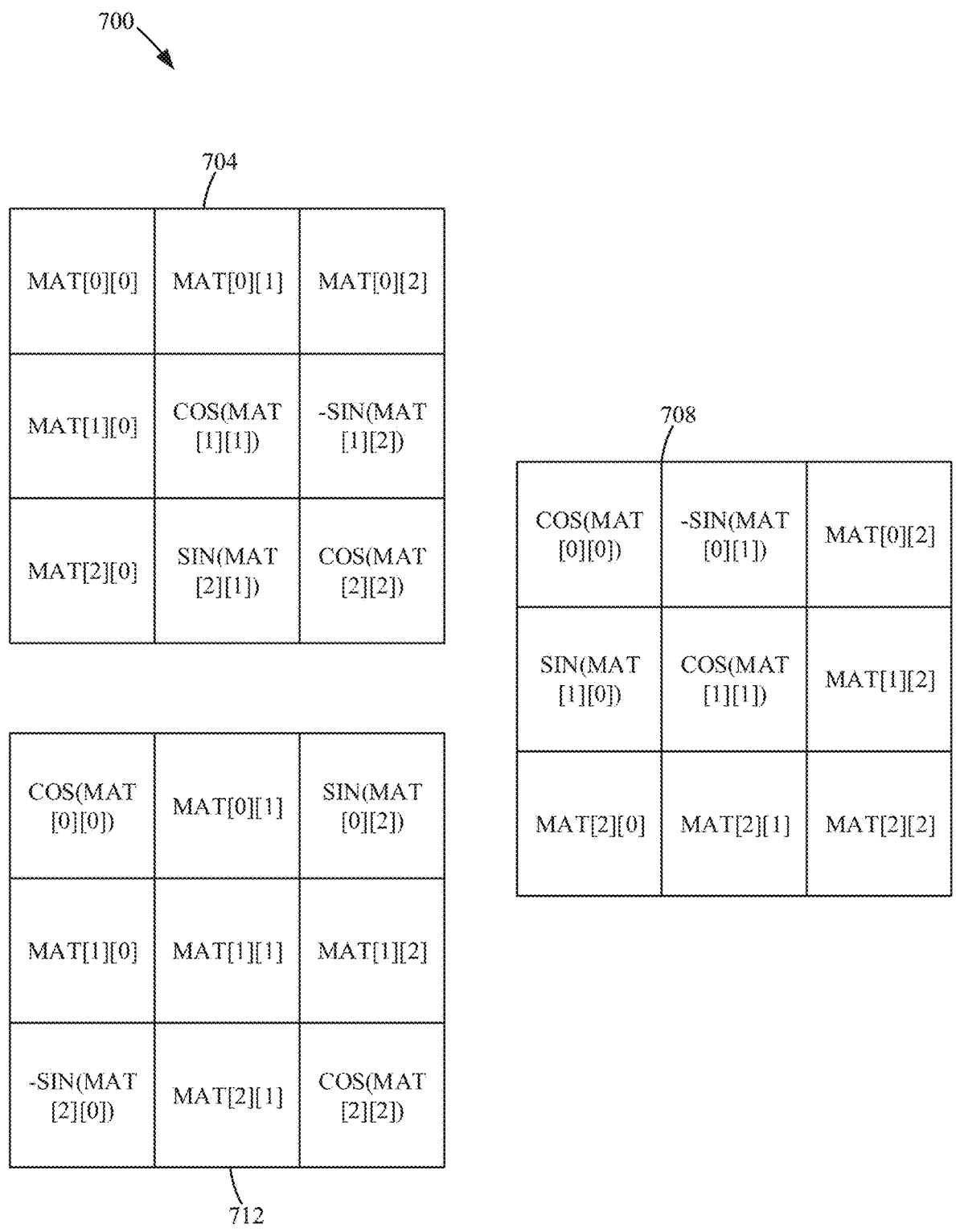
FIG. 7 is a representation of example rotational matrices used by the example shape template generator of FIGS. 1 and 2.

FIG. 7 is a representation of example rotational matrices used by the example template generator of FIGS. 1 and 2. In some examples, the matrices to be rotated are 3×3 shape template matrices (e.g., the template matrices 500 illustrated in FIG. 5). In some examples, three different rotational matrices are used (e.g., a 90-degree rotation matrix, a 180-degree rotation matrix, a 270-degree rotation matrix, etc.). In these examples, a shape template matrix is multiplied by each rotational matrix to produce a set of rotated template matrices. The rotated template matrices are dot multiplied together to generate a template value. The template value is utilized by the feature extractor 108 to identify a shape template that satisfies a similarity threshold with a pixel window in the input image 104.

Figure 8:
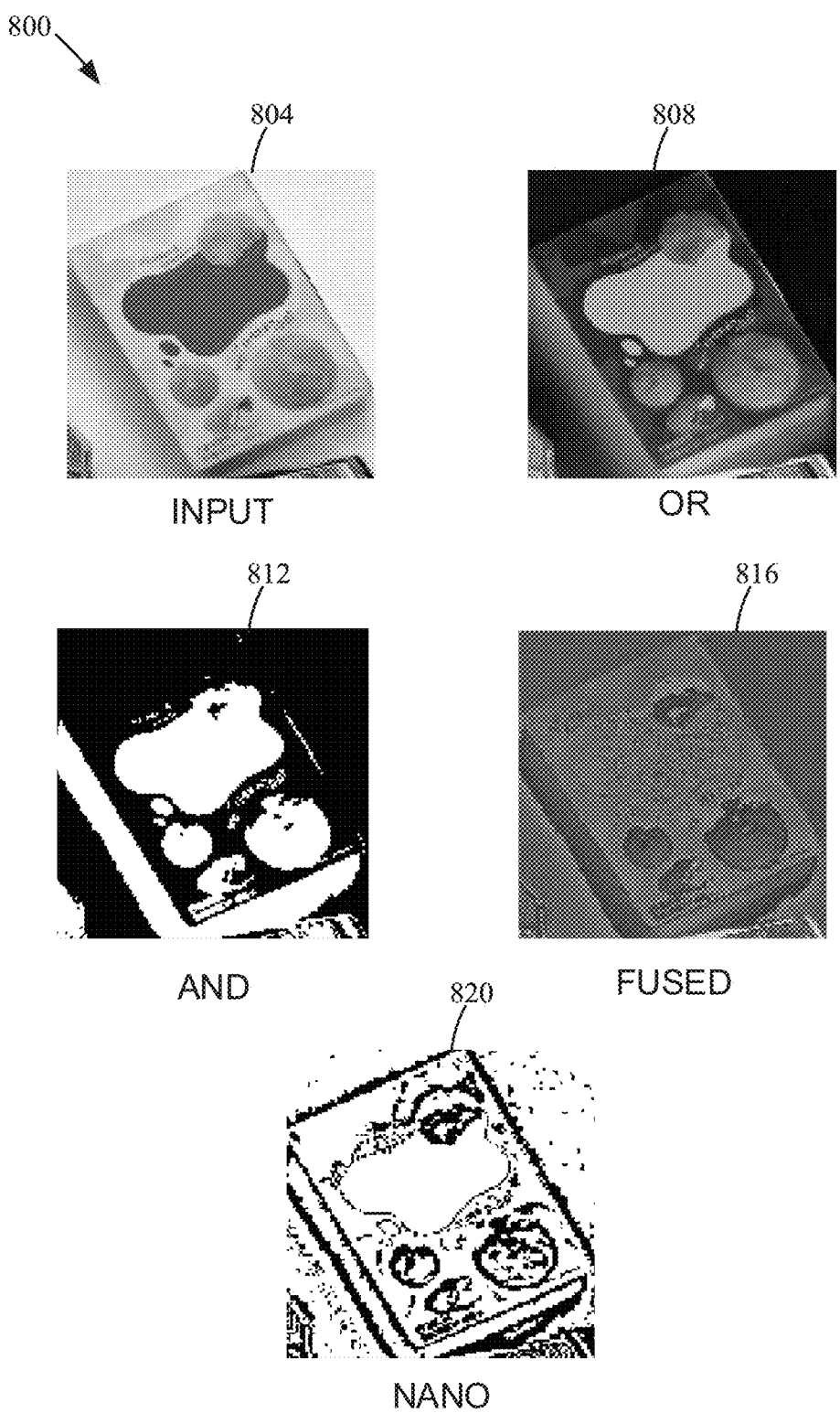
FIG. 8 is a graphical representation of example images at various stages of feature extraction.

FIG. 8 is a graphical representation of example images 800 at various stages of feature extraction. An example grayscale image 804 is an output of the image converter 112. An example bitwise OR image 808 is one of the output images of the bit slicer 124. An example bitwise AND image 812 is one of the output images of the bit slicer 124. An example fused image 816 is the output of the adaptive calculator 128. The example feature image 820 is the output of the feature extractor 108.

While an example manner of implementing the feature extractor 108 of FIG. 1 is illustrated in FIGS. 2-4, one or more of the elements, processes and/or devices illustrated in FIGS. 2-4 may be combined, divided, re-arranged, omitted, eliminated and/or implemented in any other way. Further, the example image converter 112, the example data generator 116, the example template generator 120, the example bit slicer 124, the example adaptive calculator 128, the example normalizer 132, the example down sampler 136, the example data image database 140, the example matrix generator 208, the example rotational matrix calculator 212, the example dot matrix calculator 216, the example level initializer 304, the example OR extractor 308, the example AND extractor 312, the example value comparator 316, the example level iterator 320, the example data reader 408, the example array modifier 412, the example data normalizer 416, the example data analyzer 420, and/or, more generally, the example feature extractor 108 of FIGS. 1-4 may be implemented by hardware, software, firmware and/or any combination of hardware, software and/or firmware. Thus, for example, any of the example image converter 112, the example data generator 116, the example template generator 120, the example bit slicer 124, the example adaptive calculator 128, the example normalizer 132, the example down sampler 136, the example data image database 140, the example matrix generator 208, the example rotational matrix calculator 212, the example dot matrix calculator 216, the example level initializer 304, the example OR extractor 308, the example AND extractor 312, the example value comparator 316, the example level iterator 320, the example data reader 408, the example array modifier 412, the example data normalizer 416, the example data analyzer 420, and/or, more generally, the example feature extractor 108 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example image converter 112, the example data generator 116, the example template generator 120, the example bit slicer 124, the example Gaussian calculator 128, the example normalizer 132, the example down sampler 136, the example data image database 140, the example matrix generator 208, the example rotational matrix calculator 212, the example dot matrix calculator 216, the example level initializer 304, the example OR extractor 308, the example AND extractor 312, the example value comparator 316, the example level iterator 320, the example data reader 408, the example array modifier 412, the example data normalizer 416, and the example data analyzer 420 is/are hereby expressly defined to include a non-transitory computer readable storage device or storage disk such as a memory, a digital versatile disk (DVD), a compact disk (CD), a Blu-ray disk, etc. including the software and/or firmware. Further still, the example feature extractor 108 may include one or more elements, processes and/or devices in addition to, or instead of, those illustrated in FIGS. 1-4, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Flowcharts representative of example hardware logic, machine readable instructions, hardware implemented state machines, and/or any combination thereof for implementing the feature extractor 108 of FIGS. 1, 2, 3, and/or 4 are shown in FIGS. 9-12. The machine readable instructions may be one or more executable programs or portion(s) of an executable program for execution by a computer processor and/or processor circuitry, such as the processor 1312 shown in the example processor platform 1300 discussed below in connection with FIG. 13. The program may be embodied in software stored on a non-transitory computer readable storage medium such as a CD-ROM, a floppy disk, a hard drive, a DVD, a Blu-ray disk, or a memory associated with the processor 1312, but the entire program and/or parts thereof could alternatively be executed by a device other than the processor 1312 and/or embodied in firmware or dedicated hardware. Further, although the example program is described with reference to the flowcharts illustrated in FIGS. 9-12, many other methods of implementing the example feature extractor 108 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more devices (e.g., a multi-core processor in a single machine, multiple processors distributed across a server rack, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement one or more functions that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIGS. 9-12 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

Figure 9:
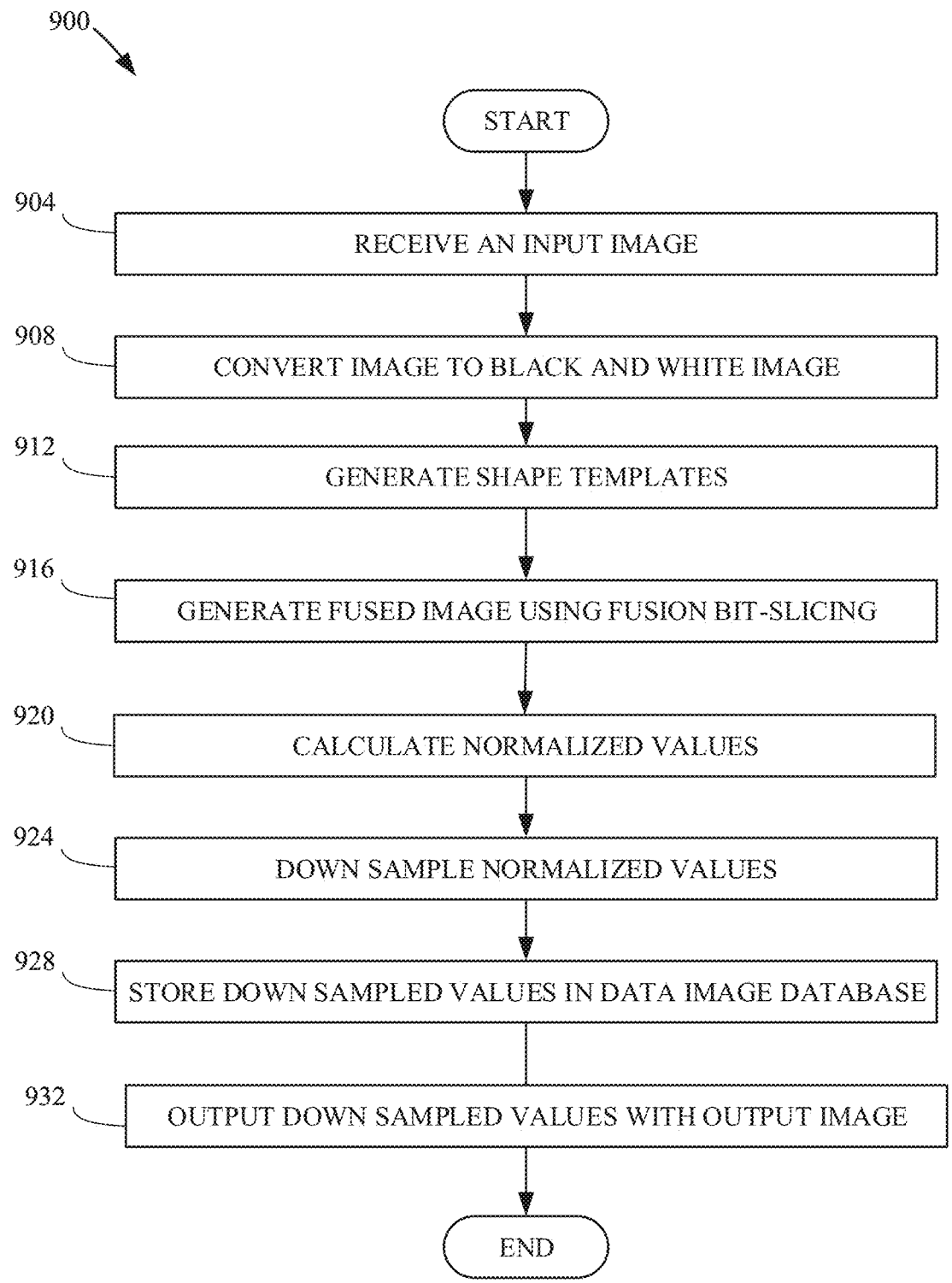
FIGS. 9-12 are flowcharts representative of machine-readable instructions which may be executed to implement the example feature extractor of FIGS. 1-4.

FIG. 9 is a flowchart representative of machine readable instructions which may be executed to implement the feature extractor 108 of FIG. 1. The process begins at block 904.

At block 904, the example feature extractor 108 receives and/or otherwise retrieves an input image 104. The input image 104 can be any visual format (e.g. .jpg, .png, etc.). The input image 104 is transmitted to the image converter 112, and at block 908, the image converter 112 converts the input image 104 into a black-and-white image. The image converter 112 transmits the black-and-white image to the data generator 116. The process proceeds to block 912.

At block 912, the example data generator 116 and the example template generator 120 generate a set of shape templates. The shape templates are square matrices that include values depending on the color of each element of the matrix. In this example, a value of 1 indicates the element is to be colored white and a value of 0 indicates the element is to be colored black.

In some examples, the shape template has a template value based on the values of the elements in the template. In some examples, the template value is based on a summation of the values in the shape template. In other examples, the template value is based on the location of elements corresponding to a value of 1. In this example, the shape template matrices are 3×3 matrices. In this example, the set of shape templates includes 83 shape templates (see FIGS. 5a through 5g). Examples disclosed herein may include any value for any color, any size square matrix, and any number of shape templates in the set, as described in further detail in FIGS. 1 and 2. The process proceeds to block 916.

At block 916, the example bit slicer 124 and adaptive calculator 128 generate data using fusion bit-slicing. The bit slicer 124 performs bit-wise computation to generate an OR image (e.g., the OR image 808 illustrated in FIG. 8) and an AND image (e.g., the AND image 812 illustrated in FIG. 8). The adaptive calculator 128 fuses the OR image and the AND image together into a fused image (e.g., fused image 816 illustrated in FIG. 8), as described in further detail in FIGS. 1 and 3. The process proceeds to block 920.

At block 920, the example normalizer 132 calculates normalized values for each pixel window in the fused image. For instance, the normalizer 132 receives the fused image with identified edges from the adaptive calculator 128 and iterates through each row and column of pixel windows to calculate a value for each pixel window based on the values of the pixels in the window. For example, the normalizer 132 may calculate the average of the values in the pixels of each window to generate a normalized value corresponding to the pixel window, as described in further detail in FIGS. 1 and 4. In this example, each pixel window is a 3×3 matrix with each pixel including a value indicating whether the pixel is white or black, and the normalizer 132 calculates the average of the nine values of the pixel window to generate a normalized value for the window. The process proceeds to block 924.

At block 924, the example down sampler 136 down samples the normalized values. The down sampler 136 receives an array including normalized values from the normalizer, iterates through the array, and further reduces the total number of values in the array. In some examples, the down sampler 136 reduces the number of values in the array by calculating an average value for each row and column of normalized values in the input image 104. The process proceeds to block 928.

At block 928, the down sampler 136 stores the down sampled values to the data image database 140. A user can utilize the down sampled values saved to the data image database 140 to find images that satisfy a similarity threshold with the input image 104. At block 932, the down sampler 136 outputs the down sampled values with an output image 144.

Figure 10:
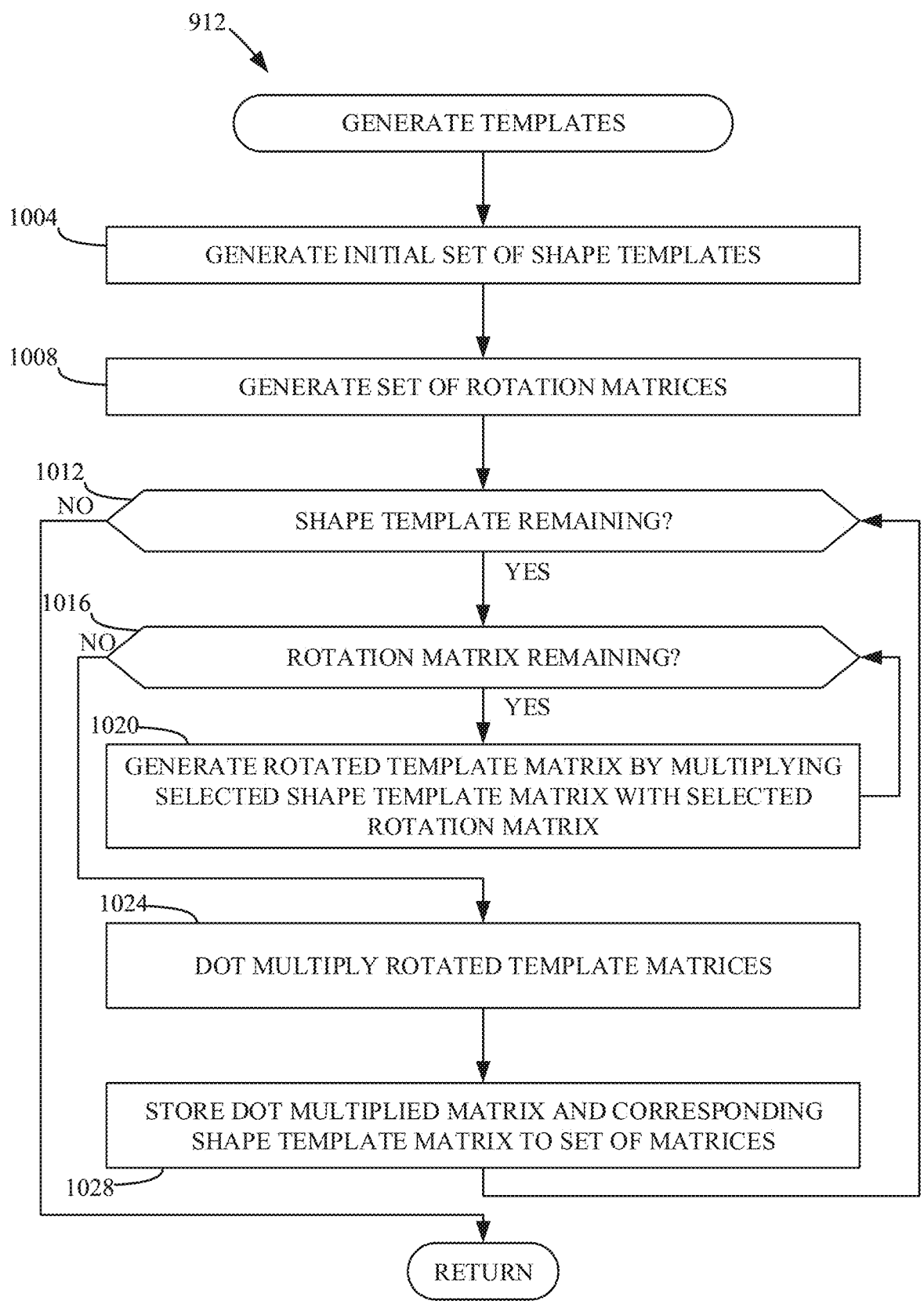

FIG. 10 is a flowchart representative of machine readable instructions which may be executed to implement the template generator 102 of FIGS. 1 and 2. In some examples, the machine readable instructions illustrated in FIG. 10 may be used to implement step 912 of FIG. 9 to generate shape templates. The process begins at block 1004.

At block 1004, the matrix generator 208 creates an initial set of shape templates. In this example, the shape templates are a quantity of eighty-three 3×3 matrices, as described above in connection with FIGS. 5a through 5g. At block 1008, the rotational matrix calculator 212 generates an initial set of rotation matrices. In this example, the rotational matrix calculator 212 calculates three rotation matrices (e.g., the rotation matrices 700 illustrated in FIG. 7). At block 1012, the data generator 116 determines whether a shape template matrix remains to be multiplied with the rotation matrices. If the data generator 116 determines that all the shape template matrices have been multiplied with the rotation matrices, the process completes and returns to block 916 of FIG. 9. However, if the data generator 116 determines that one or more shape templates matrices remain to be multiplied by the rotation matrices, the data generator 116 selects one of the remaining template matrices and the process proceeds to block 1016.

At block 1016, the data generator 116 determines whether one or more rotation matrices remain to be multiplied with the selected shape template matrix. If the data generator 116 determines that the selected shape template matrix has been multiplied with all rotation matrices, the process proceeds to block 1024. If the data generator 116 determines that one or more rotation matrices remain to be multiplied with the selected shape template matrix, the data generator 116 selects one of the remaining rotation matrices and the process proceeds to block 1020.

At block 1020, the rotational matrix calculator 212 generates a rotated template matrix by multiplying the selected shape template matrix with the selected rotation matrix. The rotational matrix calculator 212 stores the rotated template matrix and the process returns to block 1016. At block 1024, the dot matrix calculator 216 dot multiplies the rotated template matrices generated at block 1020 together. At block 1028, the dot matrix calculator 216 appends the dot multiplication result and the original shape template matrix to a set of dot multiplication results and original shape templates. The process returns to block 1012.

FIG. 11

Figure 11:
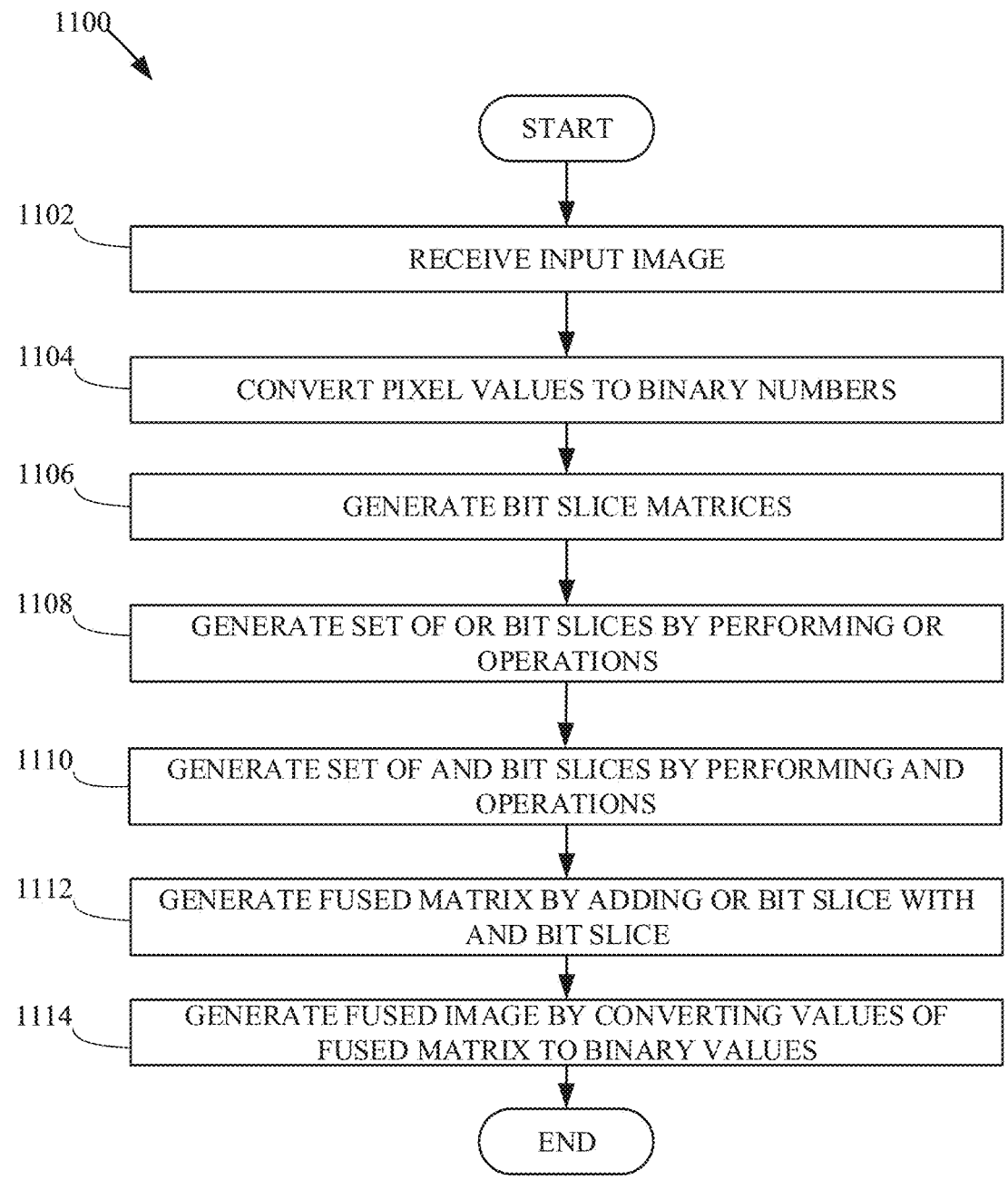

FIG. 11 is a flowchart representative of machine readable instructions which may be executed to implement the bit slicer 124 and adaptive calculator 128 of FIGS. 1 and 3. In some examples, the machine readable instructions illustrated in FIG. 11 may be used to implement step 916 of FIG. 9 to generate data using fusion bit-slicing. The process begins at block 1102.

At block 1102, the bit slicer 124 receives an input image (e.g., input image 302 302 of FIG. 3). At block 1104, the bit slicer converts the pixel values of the input image 302 to binary numbers (e.g., 8-bit binary numbers).

At block 1106, the plane generator 304 generates a plurality of plane matrices. In some examples, the plane generator 304 generates eight plane matrices (e.g., M[0]-M[7]), each plane matrix having a plurality of elements with the same value. For example, the example plane generator 304 may generate a first plane matrix (e.g., M[0]) having a plurality of elements with a value of 1, a second plane matrix (e.g., M[1]) having a plurality of elements with a value of 2, a third plane matrix (e.g., M[2]) having a plurality of elements with a value of 4, a fourth plane matrix (e.g., M[3]) having a plurality of elements with a value of 8, a fifth plane matrix (e.g., M[4]) having a plurality of elements with a value of 16, a sixth plane matrix (e.g., M[5]) having a plurality of elements with a value of 32, a seventh plane matrix (e.g., M[6]) having a plurality of elements with a value of 64, and an eighth plane matrix (e.g., M[7]) having a plurality of elements with a value of 128.

At block 1108, the example OR extractor generates a plurality of OR bit slices (e.g., the plurality of OR bit slices 602 illustrated in FIG. 6) by performing an OR comparison between the input image 302 and the plane matrices generated by the example plane generator 304. In some examples, the example OR extractor 306 generates eight OR bit slices (e.g., the OR bit slices OR[0]-OR[7] 602 illustrated in FIG. 6) by performing an OR comparison between the input image 302 and each of the plurality of plane matrices (e.g., M[0]-M[7]) as described in connection with FIG. 3. In some examples, the example OR extractor 306 performs an OR comparison between each pixel in the input image 302 and each corresponding element of a plane matrix.

At block 1110, the example AND extractor 308 generates a plurality of AND bit slices (e.g., the plurality of OR bit slices illustrated in FIG. 6) by performing an AND comparison between the input image 302 and the plane matrices generated by the example plane generator 304. In some examples, the example AND extractor 308 generates eight AND bit slices (e.g., the AND bit slices AND[0]-AND[7] 602 illustrated in FIG. 6) by performing an AND comparison between the input image 302 and each of the plurality of plane matrices (e.g., M[0]-M[7]) as described in connection with FIG. 3 above. In some examples, the example AND extractor 308 performs an AND comparison between each pixel in the input image 302 and each corresponding element of a plane matrix.

At block 1112, the adaptive calculator 128 generates a fused matrix by adding an OR bit slice (e.g., the $0^{th}$ OR bit slice) and an AND bit slice (e.g., the $6^{th}$ AND bit slice). At block 1114, the adaptive calculator 128 generates a fused image by converting the values of the fused matrix to binary values. In some examples, the adaptive calculator 128 converts the values of the fused matrix to binary values by applying an adaptive Gaussian threshold to the values of the fused matrix. The adaptive calculator 128 outputs the fused image to the normalizer 132. The sub-process ends and returns to the parent process.

Figure 12:
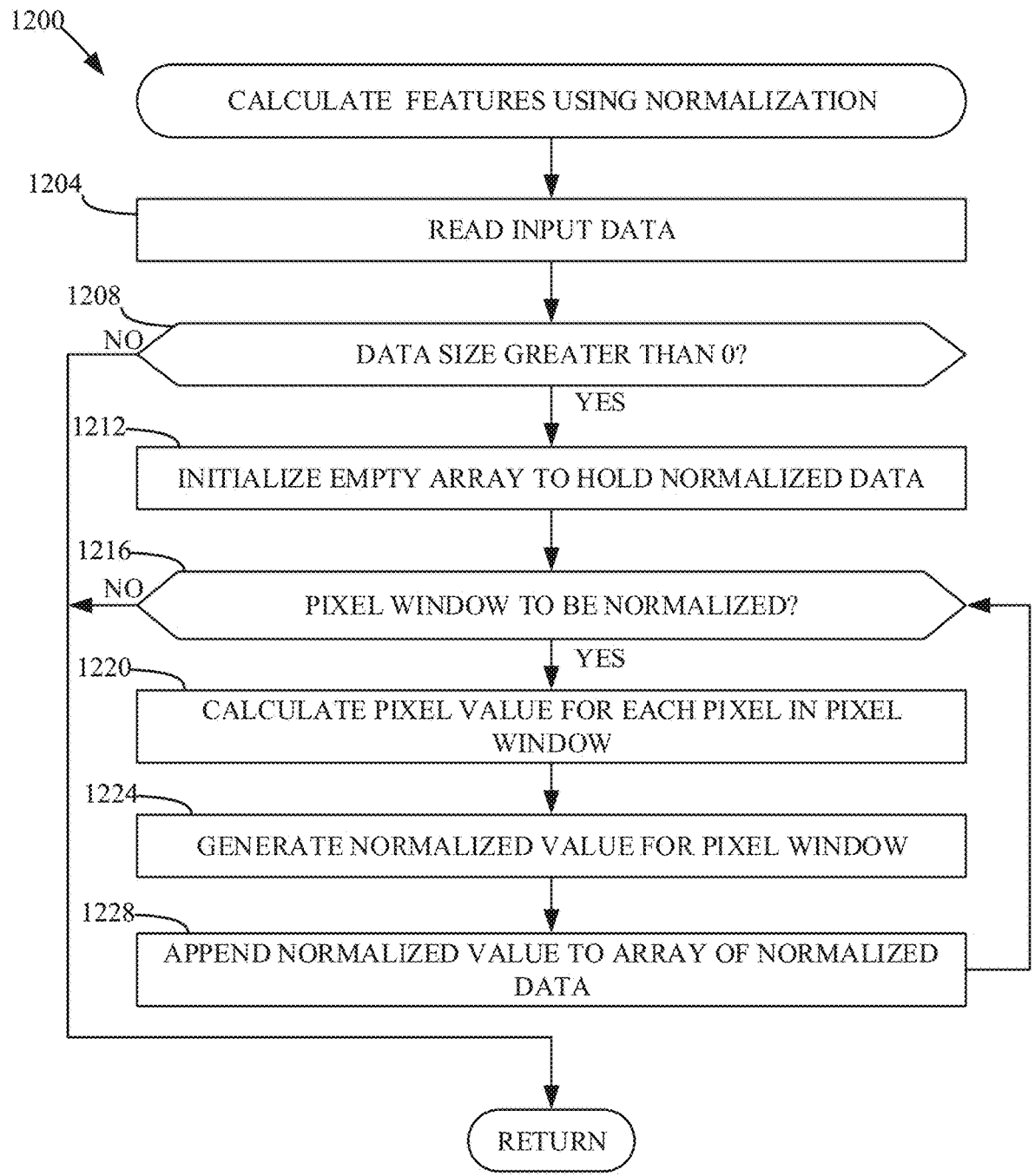

FIG. 12 is a flowchart representative of machine readable instructions which may be executed to implement the normalizer 132 of FIGS. 1 and 4. In some examples, the machine readable instructions illustrated in FIG. 12 may be used to implement step 920 of FIG. 9 to calculate features using normalization. The process begins at block 1204.

At block 1204, the data reader 408 reads the input data 404 and determines the size of the data. At block 1208, the data reader 408 determines whether the size of the data is greater than 0. If the data reader 408 determines that the size of the data is not greater than 0, the data reader 408 throws an error and the subprocess ends and returns to the parent process. If the data reader 408 determines the size of the data is greater than 0, the process proceeds to block 1212.

At block 1212, the array modifier 412 initializes an empty array to hold the normalized data. The process proceeds to block 1216. At block 1216, the data analyzer 420 determines whether a pixel window remains to be normalized. If the data analyzer 420 determines that there are no more pixel windows to be normalized, the subprocess ends and returns to the parent process. If the data analyzer 420 determines there are pixels windows remaining to be normalized, the process proceeds to block 1220.

At block 1220, the data normalizer 416 selects the next pixel window to be normalized and calculates a pixel value (e.g., a 1 or a 0) for each pixel in the window. The pixel value is temporarily saved. The process proceeds to block 1224.

At block 1224, the data normalizer 416 generates a normalized value for the pixel window by calculating the average of the pixel values in the selected window. In other examples, the data normalizer 416 sums the pixel values in the selected window. The process proceeds to block 1228.

At block 1228, the array modifier 412 appends the normalized value to an array of normalized data. The array modifier 412 stores the array of normalized data. The process returns to block 1216.

Figure 13:
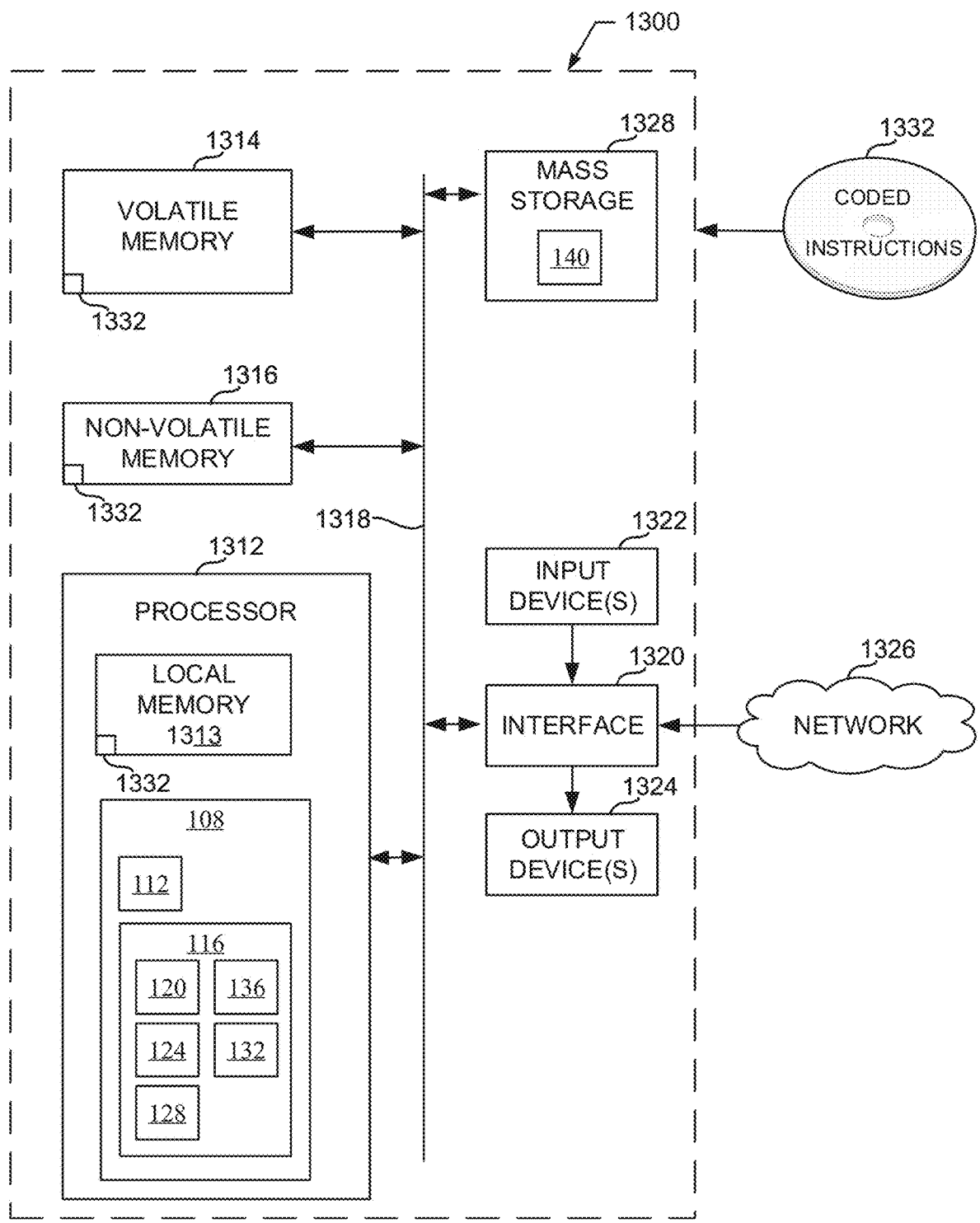
FIG. 13 is a block diagram of an example processing platform structured to execute the instructions of FIGS. 9, 10, 11, and 12, to implement the apparatus of FIGS. 1-4.

FIG. 13 is a block diagram of an example processor platform 1300 structured to execute the instructions of FIGS. 9, 10, 11, and 12 to implement the feature extractor 108 of FIG. 1. The processor platform 1300 can be, for example, a server, a personal computer, a workstation, a self-learning machine (e.g., a neural network), a mobile device (e.g., a cell phone, a smart phone, a tablet such as an iPad), a personal digital assistant (PDA), an Internet appliance, a gaming console, or any other type of computing device.

The processor platform 1300 of the illustrated example includes a processor 1312. The processor 1312 of the illustrated example is hardware. For example, the processor 1312 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example feature extractor 108, the example image converter 112, the example data generator 116, the example template generator 120, the example bit slicer 124, the example adaptive calculator 128, the example normalizer 132, and the example down sampler 136.

The processor 1312 of the illustrated example includes a local memory 1313 (e.g., a cache). The processor 1312 of the illustrated example is in communication with a main memory including a volatile memory 1314 and a non-volatile memory 1316 via a bus 1318. The volatile memory 1314 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1316 may be implemented by flash memory and/or any other desired type of memory device. Access to the main memory 1314, 1316 is controlled by a memory controller.

The processor platform 1300 of the illustrated example also includes an interface circuit 1320. The interface circuit 1320 may be implemented by any type of interface standard, such as an Ethernet interface, a universal serial bus (USB), a Bluetooth® interface, a near field communication (NFC) interface, and/or a PCI express interface.

In the illustrated example, one or more input devices 1322 are connected to the interface circuit 1320. The input device(s) 1322 permit(s) a user to enter data and/or commands into the processor 1312. The input device(s) can be implemented by, for example, a camera (still or video), a keyboard, a button, a mouse, a touchscreen, a track-pad, a trackball, isopoint and/or a voice recognition system.

One or more output devices 1324 are also connected to the interface circuit 1320 of the illustrated example. The output devices 1324 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 1320 of the illustrated example, thus, typically includes a graphics driver card, a graphics driver chip and/or a graphics driver processor.

The interface circuit 1320 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1326. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1300 of the illustrated example also includes one or more mass storage devices 1328 for storing software and/or data. Examples of such mass storage devices 1328 include floppy disk drives, hard drive disks, compact disk drives, Blu-ray disk drives, redundant array of independent disks (RAID) systems, and digital versatile disk (DVD) drives.

The machine executable instructions 1332 of FIGS. 9, 10, 11, and 12 may be stored in the mass storage device 1328, in the volatile memory 1314, in the non-volatile memory 1316, and/or on a removable non-transitory computer readable storage medium such as a CD or DVD.

From the foregoing, it will be appreciated that example methods, apparatus and articles of manufacture have been disclosed that enable a user to identify features within an image and recover images that satisfy a similarity threshold. The disclosed methods, apparatus and articles of manufacture improve the efficiency of using a computing device by performing high-accuracy feature detection to extract features from images, categorize images with similar features, and allow users to discover similar images. The disclosed methods, apparatus and articles of manufacture are accordingly directed to one or more improvement(s) in the functioning of a computer.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

Example methods, apparatus, systems, and articles of manufacture to extract shape features based on a structural angle template are disclosed herein. Further examples and combinations thereof include the following:

Example 1 includes an apparatus including a template generator to generate a template based on an input image, the template including a plurality of elements, each element including a value, and calculate a template value based on the values in the template; a bit slicer to calculate an OR bit slice and an AND bit slice based on the input image, combine the OR bit slice with the AND bit slice to generate a fused image, group a plurality of pixels of the fused image together to generate a pixel window, each pixel of the pixel window including a pixel value, and calculate a window value based on the pixel values of the pixel window; and a comparator to compare the template value with the window value and store the pixel window in response to determining the window value satisfies a similarity threshold with the template value.

Example 2 includes the apparatus of example 1, further including a normalizer to calculate an average pixel value for each pixel window to generate an array of normalized data.

Example 3 includes the apparatus of example 2, further including a down sampler to calculate an average value for each row and column in the array of normalized data to generate a vector of down-sampled values.

Example 4 includes the apparatus of example 1, wherein the template generator includes a rotational matrix calculator to generate a plurality of rotated matrices based on the template by rotating the template and a dot matrix calculator to calculate the template value by calculating a dot product of the plurality of rotated matrices.

Example 5 includes the apparatus of example 4, wherein the rotational matrix calculator is to generate the plurality of rotated matrices by rotating the template by 90 degrees to generate a first rotated matrix, rotating the template by 180 degrees to generate a second rotated matrix, and rotating the template by 270 degrees to generate a third rotated matrix.

Example 6 includes the apparatus of example 1, wherein the bit slicer includes a plane generator to generate a first plane matrix having a plurality of elements with a first value and a second plane matrix having a plurality of elements with a second value, an OR extractor to generate the OR bit slice by performing an OR comparison between a binary value of a pixel in the input image and a binary value of a corresponding element of the first plane matrix, and an AND extractor to generate the AND bit slice by performing an AND comparison between the binary value of the pixel in the input image and a binary value of a corresponding element of the second plane matrix.

Example 7 includes the apparatus of example 6, further including an adaptive calculator to combine the OR bit slice with the AND bit slice to generate a fused matrix, identify one more edges of an object in the input image based on the fused matrix, generate the fused image based on the fused matrix, and output the fused image with the one or more identified edges.

Example 8 includes at least one non-transitory computer-readable storage medium including instructions that, when executed, cause at least one processor to at least generate a template based on an input image, the template including a plurality of elements, each element including a value; calculate a template value based on the values in the template, calculate an OR bit slice and an AND bit slice based on the input image; combine the OR bit slice with the AND bit slice to generate a fused image; group a plurality of pixels of the fused image together to generate a pixel window, each pixel of the pixel window including a pixel value; calculate a window value based on the pixel values of the pixel window; perform a comparison the template value with the window value; and store the pixel window in response to determining the window value satisfies a similarity threshold with the template value.

Example 9 includes the at least one non-transitory computer-readable storage medium of example 8, wherein the instructions, when executed, cause the at least one processor to calculate an average pixel value for each pixel window to generate an array of normalized data.

Example 10 includes the at least one non-transitory computer-readable storage medium of example 9, wherein the instructions, when executed, cause the at least one processor calculate an average value for each row and column in the array of normalized data to generate a vector of down-sampled values.

Example 11 includes the at least one non-transitory computer-readable storage medium of example 8, wherein the instructions, when executed, cause the at least one processor to generate a plurality of rotated matrices based on the template by rotating the template and calculate the template value by calculating a dot product of the plurality of rotated matrices.

Example 12 includes the at least one non-transitory computer-readable storage medium of example 11, wherein the instructions, when executed, cause the at least one processor to generate the plurality of rotated matrices by rotating the template by 90 degrees to generate a first rotated matrix, rotating the template by 180 degrees to generate a second rotated matrix, and rotating the template by 270 degrees to generate a third rotated matrix.

Example 13 includes the at least one non-transitory computer-readable storage medium of example 8, wherein the instructions, when executed, cause the at least one processor to generate a first plane matrix having a plurality of elements with a first value and a second plane matrix having a plurality of elements with a second value, generate the OR bit slice by performing an OR comparison between a binary value of a pixel in the input image and a binary value of a corresponding element of the first plane matrix, and generate the AND bit slice by performing an AND comparison between the binary value of the pixel in the input image and a binary value of a corresponding element of the second plane matrix.

Example 14 includes the at least one non-transitory computer-readable storage medium of example 8, wherein the instructions, when executed, cause the at least one processor to combine the OR bit slice with the AND bit slice to generate a fused matrix, identify one more edges of an object in the input image based on the fused matrix, generate the fused image based on the fused matrix, and output the fused image with the one or more identified edges.

Example 15 includes an apparatus including at least one memory, instructions, and at least one processor to execute the instructions to generate a template based on an input image, the template including a plurality of elements, each element including a value; calculate a template value based on the values in the template; calculate an OR bit slice and an AND bit slice based on the input image; combine the OR bit slice with the AND bit slice to generate a fused image; group a plurality of pixels of the fused image together to generate a pixel window, each pixel of the pixel window including a pixel value; calculate a window value based on the pixel values of the pixel window; perform a comparison the template value with the window value; and store the pixel window in response to determining the window value satisfies a similarity threshold with the template value.

Example 16 includes the apparatus of example 15, wherein the at least one processor is to execute the instructions to calculate an average pixel value for each pixel window to generate an array of normalized data.

Example 17 includes the apparatus of example 16, wherein the at least one processor is to execute the instructions to calculate an average value for each row and column in the array of normalized data to generate a vector of down-sampled values.

Example 18 includes the apparatus of example 15, wherein the at least one processor is to execute the instructions to generate a plurality of rotated matrices based on the template by rotating the template and calculate the template value by calculating a dot product of the plurality of rotated matrices.

Example 19 includes the apparatus of example 18, wherein the at least one processor is to execute the instructions to generate the plurality of rotated matrices by rotating the template by 90 degrees to generate a first rotated matrix, rotating the template by 180 degrees to generate a second rotated matrix, and rotating the template by 270 degrees to generate a third rotated matrix.

Example 20 includes the apparatus of example 15, wherein the at least one processor is to execute the instructions to generate a first plane matrix having a plurality of elements with a first value and a second plane matrix having a plurality of elements with a second value, generate the OR bit slice by performing an OR comparison between a binary value of a pixel in the input image and a binary value of a corresponding element of the first plane matrix, and generate the AND bit slice by performing an AND comparison between the binary value of the pixel in the input image and a binary value of a corresponding element of the second plane matrix.

Example 21 includes the apparatus of example 15, wherein the at least one processor is to execute the instructions to combine the OR bit slice with the AND bit slice to generate a fused matrix; identify one more edges of an object in the input image based on the fused matrix; generate the fused image based on the fused matrix; and output the fused image with the one or more identified edges.

Example 22 includes a method including generating a template based on an input image, the template including a plurality of elements, each element including a value; calculating a template value based on the values in the template; calculating an OR bit slice and an AND bit slice based on the input image; combining the OR bit slice with the AND bit slice to generate a fused image; grouping a plurality of pixels of the fused image together to generate a pixel window, each pixel of the pixel window including a pixel value; calculating a window value based on the pixel values of the pixel window; performing a comparison the template value with the window value; and storing the pixel window in response to determining the window value satisfies a similarity threshold with the template value.

Example 23 includes the method of example 22, further including calculating an average pixel value for each pixel window to generate an array of normalized data.

Example 24 includes the method of example 23, further including calculating an average value for each row and column in the array of normalized data to generate a vector of down-sampled values.

Example 25 includes the method of example 22, further including generating a plurality of rotated matrices based on the template by rotating the template and calculating the template value by calculating a dot product of the plurality of rotated matrices.

Example 26 includes the method of example 25, further including generating the plurality of rotated matrices by rotating the template by 90 degrees to generate a first rotated matrix, rotating the template by 180 degrees to generate a second rotated matrix, and rotating the template by 270 degrees to generate a third rotated matrix.

Example 27 includes the method of example 22, further including generating a first plane matrix having a plurality of elements with a first value and a second plane matrix having a plurality of elements with a second value generating the OR bit slice by performing an OR comparison between a binary value of a pixel in the input image and a binary value of a corresponding element of the first plane matrix; and generating the AND bit slice by performing an AND comparison between the binary value of the pixel in the input image and a binary value of a corresponding element of the second plane matrix.

Example 28 includes the method of example 22, further including combining the OR bit slice with the AND bit slice to generate a fused matrix; identifying one more edges of an object in the input image based on the fused matrix; generating the fused image based on the fused matrix; and outputting the fused image with the one or more identified edges.

The following claims are hereby incorporated into this Detailed Description by this reference, with each claim standing on its own as a separate embodiment of the present disclosure.

What is claimed is:

1. An apparatus, comprising:
    a template generator to:
        generate a template based on an input image, the template including a plurality of elements, each element including a value; and
        calculate a template value based on the values of the plurality of elements in the template;
    a bit slicer to:
        calculate an OR bit slice and an AND bit slice based on the input image;
        combine the OR bit slice with the AND bit slice to generate a fused image;
        group a plurality of pixels of the fused image together to generate a pixel window, each pixel of the pixel window including a pixel value; and
        calculate a window value based on the pixel values of the pixel window; and
    a comparator to compare the template value with the window value and store the pixel window in response to determining that the window value satisfies a similarity threshold with the template value.

2. The apparatus of claim 1, further including a normalizer to calculate an average pixel value for each pixel window to generate an array of normalized data.

3. The apparatus of claim 2, further including a down sampler to calculate an average value for each row and column in the array of normalized data to generate a vector of down-sampled values.

4. The apparatus of claim 1, wherein the template generator includes a rotational matrix calculator to:
    generate a plurality of rotated matrices based on the template by rotating the template; and output a set of shape templates including the template and the rotated matrices.

5. The apparatus of claim 4, wherein the rotational matrix calculator is to generate the plurality of rotated matrices by:
rotating the template by 90 degrees to generate a first rotated matrix;
rotating the template by 180 degrees to generate a second rotated matrix; and
rotating the template by 270 degrees to generate a third rotated matrix.

6. The apparatus of claim 1, wherein the bit slicer includes:
a plane generator to generate a first plane matrix having a plurality of elements with a first value and a second plane matrix having a plurality of elements with a second value;
an OR extractor to generate the OR bit slice by performing an OR comparison between a binary value of a pixel in the input image and a binary value of a corresponding element of the first plane matrix; and
an AND extractor to generate the AND bit slice by performing an AND comparison between the binary value of the pixel in the input image and a binary value of a corresponding element of the second plane matrix.

7. The apparatus of claim 6, further including an adaptive calculator to:
combine the OR bit slice with the AND bit slice to generate a fused matrix;
identify one or more edges of an object in the input image based on the fused matrix;
generate the fused image based on the fused matrix; and
output the fused image with the one or more identified edges.

8. At least one non-transitory computer-readable storage medium comprising instructions that, when executed, cause at least one processor to at least:
generate a template based on an input image, the template including a plurality of elements, each element including a value;
calculate a template value based on the values of the plurality of elements in the template;
calculate an OR bit slice and an AND bit slice based on the input image;
combine the OR bit slice with the AND bit slice to generate a fused image;
group a plurality of pixels of the fused image together to generate a pixel window, each pixel of the pixel window including a pixel value;
calculate a window value based on the pixel values of the pixel window;
perform a comparison the template value with the window value; and
store the pixel window in response to determining that the window value satisfies a similarity threshold with the template value.

9. The at least one non-transitory computer-readable storage medium of claim 8, wherein the instructions, when executed, cause the at least one processor to calculate an average pixel value for each pixel window to generate an array of normalized data.

10. The at least one non-transitory computer-readable storage medium of claim 9, wherein the instructions, when executed, cause the at least one processor to calculate an average value for each row and column in the array of normalized data to generate a vector of down-sampled values.

11. The at least one non-transitory computer-readable storage medium of claim 8, wherein the instructions, when executed, cause the at least one processor to:
generate a plurality of rotated matrices based on the template by rotating the template; and
output a set of shape templates including the template and the rotated matrices.

12. The at least one non-transitory computer-readable storage medium of claim 11, wherein the instructions, when executed, cause the at least one processor to generate the plurality of rotated matrices by:
rotating the template by 90 degrees to generate a first rotated matrix;
rotating the template by 180 degrees to generate a second rotated matrix; and
rotating the template by 270 degrees to generate a third rotated matrix.

13. The at least one non-transitory computer-readable storage medium of claim 8, wherein the instructions, when executed, cause the at least one processor to:
generate a first plane matrix having a plurality of elements with a first value and a second plane matrix having a plurality of elements with a second value;
generate the OR bit slice by performing an OR comparison between a binary value of a pixel in the input image and a binary value of a corresponding element of the first plane matrix; and
generate the AND bit slice by performing an AND comparison between the binary value of the pixel in the input image and a binary value of a corresponding element of the second plane matrix.

14. The at least one non-transitory computer-readable storage medium of claim 8, wherein the instructions, when executed, cause the at least one processor to:
combine the OR bit slice with the AND bit slice to generate a fused matrix;
identify one or more edges of an object in the input image based on the fused matrix;
generate the fused image based on the fused matrix; and
output the fused image with the one or more identified edges.

15. An apparatus, comprising:
at least one memory;
machine-readable instructions; and
at least one processor to execute the machine-readable instructions to:
generate a template based on an input image, the template including a plurality of elements, each element including a value;
calculate a template value based on the values of the plurality of elements in the template;
calculate an OR bit slice and an AND bit slice based on the input image;
combine the OR bit slice with the AND bit slice to generate a fused image;
group a plurality of pixels of the fused image together to generate a pixel window, each pixel of the pixel window including a pixel value;
calculate a window value based on the pixel values of the pixel window;
perform a comparison the template value with the window value; and
store the pixel window in response to determining that the window value satisfies a similarity threshold with the template value.

16. The apparatus of claim 15, wherein the at least one processor is to execute the machine-readable instructions to calculate an average pixel value for each pixel window to generate an array of normalized data.

17. The apparatus of claim 16, wherein the at least one processor is to execute the machine-readable instructions to calculate an average value for each row and column in the array of normalized data to generate a vector of down-sampled values.

18. The apparatus of claim 15, wherein the at least one processor is to execute the machine-readable instructions to:
generate a plurality of rotated matrices based on the template by rotating the template; and
output a set of shape templates including the template and the rotated matrices.

19. The apparatus of claim 15, wherein the at least one processor is to execute the machine-readable instructions to:
generate a first plane matrix having a plurality of elements with a first value and a second plane matrix having a plurality of elements with a second value;
generate the OR bit slice by performing an OR comparison between a binary value of a pixel in the input image and a binary value of a corresponding element of the first plane matrix; and
generate the AND bit slice by performing an AND comparison between the binary value of the pixel in the input image and a binary value of a corresponding element of the second plane matrix.

20. The apparatus of claim 15, wherein the at least one processor is to execute the machine-readable instructions to:
combine the OR bit slice with the AND bit slice to generate a fused matrix;
identify one or more edges of an object in the input image based on the fused matrix;
generate the fused image based on the fused matrix; and
output the fused image with the one or more identified edges.

21. The apparatus of claim 1, wherein the template generator is to calculate the template value based on a summation of the values of the plurality of elements in the template.

22. The at least one non-transitory computer-readable storage medium of claim 8, wherein the instructions, when executed, cause the at least one processor to calculate the template value based on a summation of the values of the plurality of elements in the template.

23. The apparatus of claim 15, wherein the at least one processor is to execute the machine-readable instructions to calculate the template value based on a summation of the values of the plurality of elements in the template.

* * * * *